United States Patent [19]
Gupta et al.

[11] Patent Number: 6,044,221
[45] Date of Patent: Mar. 28, 2000

[54] OPTIMIZING CODE BASED ON RESOURCE SENSITIVE HOISTING AND SINKING

[75] Inventors: Rajiv Gupta, Pittsburgh, Pa.; David A. Berson, Fremont; Jesse Z. Fang, San Jose, both of Calif.

[73] Assignee: Intel Corporation, Santa Clara, Calif.

[21] Appl. No.: 08/853,287

[22] Filed: May 9, 1997

[51] Int. Cl.$^7$ .................................................. G06F 9/45
[52] U.S. Cl. ............................................................... 395/709
[58] Field of Search ............................................. 395/709

[56] References Cited

U.S. PATENT DOCUMENTS

| | | | |
|---|---|---|---|
| 5,212,805 | 5/1993 | Comroe et al. | 455/520 |
| 5,278,985 | 1/1994 | Odnert et al. | 395/700 |
| 5,420,991 | 5/1995 | Konigsfeld et al. | 395/375 |
| 5,421,022 | 5/1995 | McKeen et al. | 395/800 |
| 5,526,499 | 6/1996 | Bernstein et al. | 395/375 |
| 5,557,761 | 9/1996 | Chan et al. | 395/709 |
| 5,835,776 | 11/1998 | Tirumalai et al. | 395/709 |
| 5,850,552 | 12/1998 | Odani et al. | 395/709 |

OTHER PUBLICATIONS

Proebsting, Demand–Driven Register Allocation, ACM Transactions on Programming Languages and Systems, vol. 18, No. 6, pp. 683–710 Nov. 1996.

"Theoretical Aspects of Computer Software", T. Ito, A.R. Meyer, International Conference TACS 1991, Sendai, Japan, Sep. 24–27, 1991 Proceedings, pp. 347–364.

"Efficient Path Profiling", Thomas Ball, James R. Larus, Proceedings of the 29th Annual IEEE/AMC International Symposium on Microarchitecture, Dec. 1996, Paris, France, pp. 46–57.

"Lazy Code Motion", Jens Knoop, et al., ACM SIGPLAN '92 PLDI–Jun. 1992/CA, pp. 224–234.

"Partial Dead Code Elimination", Jens Knoop, et al.,SIG-PLAN 94–Jun. 1994 Orlando, FL USA, pp. 147–157.

*Primary Examiner*—Tariq R. Hafiz
*Assistant Examiner*—Wei Zhen
*Attorney, Agent, or Firm*—Blakely, Sokoloff, Taylor & Zafman LLP

[57] ABSTRACT

A method and apparatus for optimizing code using resource based partial elimination techniques is disclosed. At least one location is identified in the code wherein the at least one location has available resources. One of the plurality of instructions is moved to the at least one location according to partial elimination techniques.

8 Claims, 15 Drawing Sheets

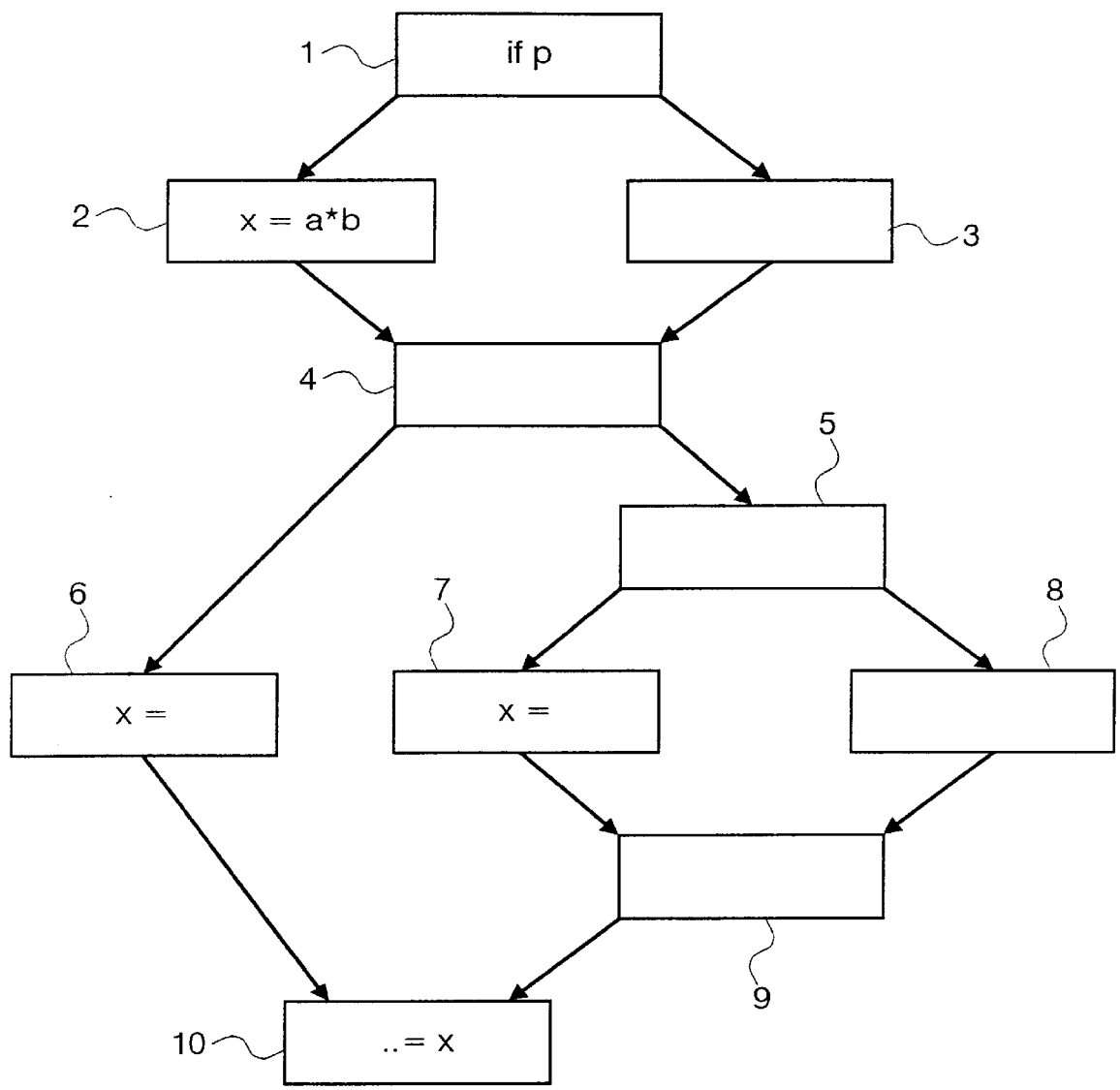

Path P1 → Nodes 1 2 4 6 7 9
Path P2 → Nodes 1 2 5 6 7 9
Path P3 → Nodes 1 2 5 6 8 9
Path P4 → Nodes 1 3 5 6 7 9
Path P5 → Nodes 1 3 5 6 8 9
Path P6 → Nodes 1 2 4 6 8 9

Figure 3A

| Path | Frequency |
|---|---|
| P1: 1 2 4 6 7 9 | 100 |
| P2: 1 2 5 6 7 9 | 100 |
| P3: 1 2 5 6 8 9 | 10 |
| P4: 1 3 5 6 7 9 | 60 |
| P5: 1 3 5 6 8 9 | 90 |
| P6: 1 2 4 6 8 9 | 20 |

Figure 3B

| Node | Cost (x+y) | Benefit (x+y) |
|---|---|---|
| 1 | 380 | 290 |
| 2 | 0 | 200 |
| 6 | 150 | 260 |

Figure 3C

| Path | Frequency |
|---|---|
| 1-2-4-6-10 | 100 |
| 1-2-4-5-7-9-10 | 90 |
| 1-2-4-5-8-9-10 | 80 |
| 1-3-4-6-10 | 70 |
| 1-3-4-5-7-9-10 | 60 |
| 1-3-4-5-8-9-10 | 50 |

Figure 3D

Cos[2: x=a*b] = 100+90=190

Benefit[2: x=a*b] = 50

$\text{Cost}_{esp}(\text{header}) = \text{Cost}_{esp}(\text{pre-header})$
$\text{Cost}_{esp}(\text{post-exit}) = \text{Cost}_{esp}(\text{post-exit}) + \text{Cost}_{esp}$
$\text{Benefit}_{esp}(\text{exit}) = \text{Benefit}_{esp}(\text{exit}) = \text{Benefit}_{esp}$
$\text{Benefit}_{esp}(\text{pre-header}) + \text{Benefit}_{esp}(\text{header})$ SumFreq(...n...) denotes the sum of frequencies of all paths that pass through n.

Freq(1-2-7-8-13) = 100
SumFreq(...4...) = 25
Sum Freq(...5...) = 35
SumFreq(...11...) = 15

EstimatedCost[x+y](7) = 60 (= SumFreq(...4...) + SumFreq(...5...))
ActualCost[x+y](7) = 25 (= SumFreq(...4...))
EstimatedBenefit[x+y](7) = 100 (=Freq(1-2-7-8-13))
ActualBenefit[x+y](7) = 115(=Freq(1-2-7-8-13)+SumFreq(...11...))

OPTIMIZING CODE BASED ON RESOURCE SENSITIVE HOISTING AND SINKING

FIELD OF THE INVENTION

The present invention relates to the field of code optimization. Specifically, the present invention discloses a method and apparatus for optimizing code based on resource sensitive hoisting and sinking.

DESCRIPTION OF RELATED ART

Dead code elimination is a technique for improving the efficiency of a program by eliminating certain unnecessary code. Code may be either completely or partially dead. Completely dead code is code whose computed values are never used. Partially dead code has its computed values used along some paths but not others. Dead code may be completely eliminated along certain paths if the code is moved to different locations in the program.

FIG. 1A illustrates an example of partially dead code. FIG. 1B illustrates the various paths of FIG. 1A. As illustrated, the statement at node 2 (x=a*b) is partially dead because the value of x computed by this statement is not used along paths P1 (nodes 1.2.4.6.10) and P2 (nodes 1.2.4.5.7.9.10) but is used along path P6 (nodes 1.3.4.5.8.9.10). The traditional approach to partial dead code elimination allows code "sinking" or moving only if the sinking can be performed without executing additional instructions along any other path. According to the traditional approach, therefore, the code in node 2 cannot be moved to a lower node because this move will result in an additional instruction being added to paths P4, P5, and P6.

Redundancy elimination is another technique for improving the efficiency of a program by avoiding repeated evaluations of the same expression when the evaluations provide the same result. Instructions in code may be either completely or partially redundant. A completely redundant instruction is one that is recomputed on all paths containing the first computation without any change in the output of the computation. An instruction is only partially redundant where the instruction is recomputed without any change in output along certain paths, but where the output does change or is not recomputed along other paths. A partially redundant instruction is thus redundant as to some paths but not redundant along other paths. Similar to dead code, redundant code may be completely eliminated along certain paths if the code is moved to different locations in the path.

FIGS. 1C illustrates an example of redundant instructions. FIG. 1D includes the various paths of FIG. 1C. Specifically, along paths that visit node 2 prior to reaching node 7 (paths P1 and P2), the evaluation of the expression "x+y" in node 7 is partially redundant because the expression is evaluated twice. The traditional approach to partial redundancy elimination will not remove this redundancy because traditional methods allow for "hoisting" or lifting of the instruction to a different location only if the hoisting can be performed without executing additional instructions along any other path. Thus, traditional methods do not allow the expression evaluated in node 7 to be hoisted above node 6 because this hoisting will result in an additional instruction being executed on paths P3, P4, and P5.

In addition to the limitation of not adding instructions along a path, traditional methods do not take into account available resources. Each node in a data flow analysis framework is associated with a predetermined number of resources to execute instructions. At some nodes, all the associated resources may be allocated to specific instructions and thus be unavailable to execute additional instructions. At other nodes, resources may be available to execute additional instructions. The traditional solutions to hoisting and sinking described above may result in the placement of the code statement at points where the functional unit resource required to execute the instruction may not be available.

SUMMARY OF THE INVENTION

The present invention discloses a method and apparatus for optimizing code using resource based partial elimination techniques. At least one location is identified in the code wherein the at least one location has available resources. One of the plurality of instructions is moved to the at least one location according to partial elimination techniques.

Other features and advantages of the present invention will be apparent from the accompanying drawings and from the detailed description.

BRIEF DESCRIPTION OF THE DRAWINGS

The present invention is illustrated by way of example and not by way of limitation in the figures of the accompanying drawings in which like reference numerals refer to similar elements and in which:

FIG. 1A illustrates an example of partially dead code

FIG. 1B illustrates available paths for the flow diagram of FIG. 1A

FIGS. 3A–3D illustrate path profiling and cost benefit information for each of the examples illustrated in FIGS. 1A and 1C

DETAILED DESCRIPTION OF THE PREFERRED EMBODIMENT

The present invention is a method and apparatus for optimizing code based on resource sensitive hoisting and sinking. Although the following assumes a static compiler system, the resource availability and cost-benefit data flow analyses described herein may also be utilized within a dynamic compiler system. Additionally, in the following detailed description, numerous specific details are set forth in order to provide a thorough understanding of the present invention. It will be apparent to one of ordinary skill in the art that these specific details need not be used to practice the present invention. In other instances, well-known structures, interfaces, and processes have not been shown in detail in order not to unnecessarily obscure the present invention.

Figure 2:
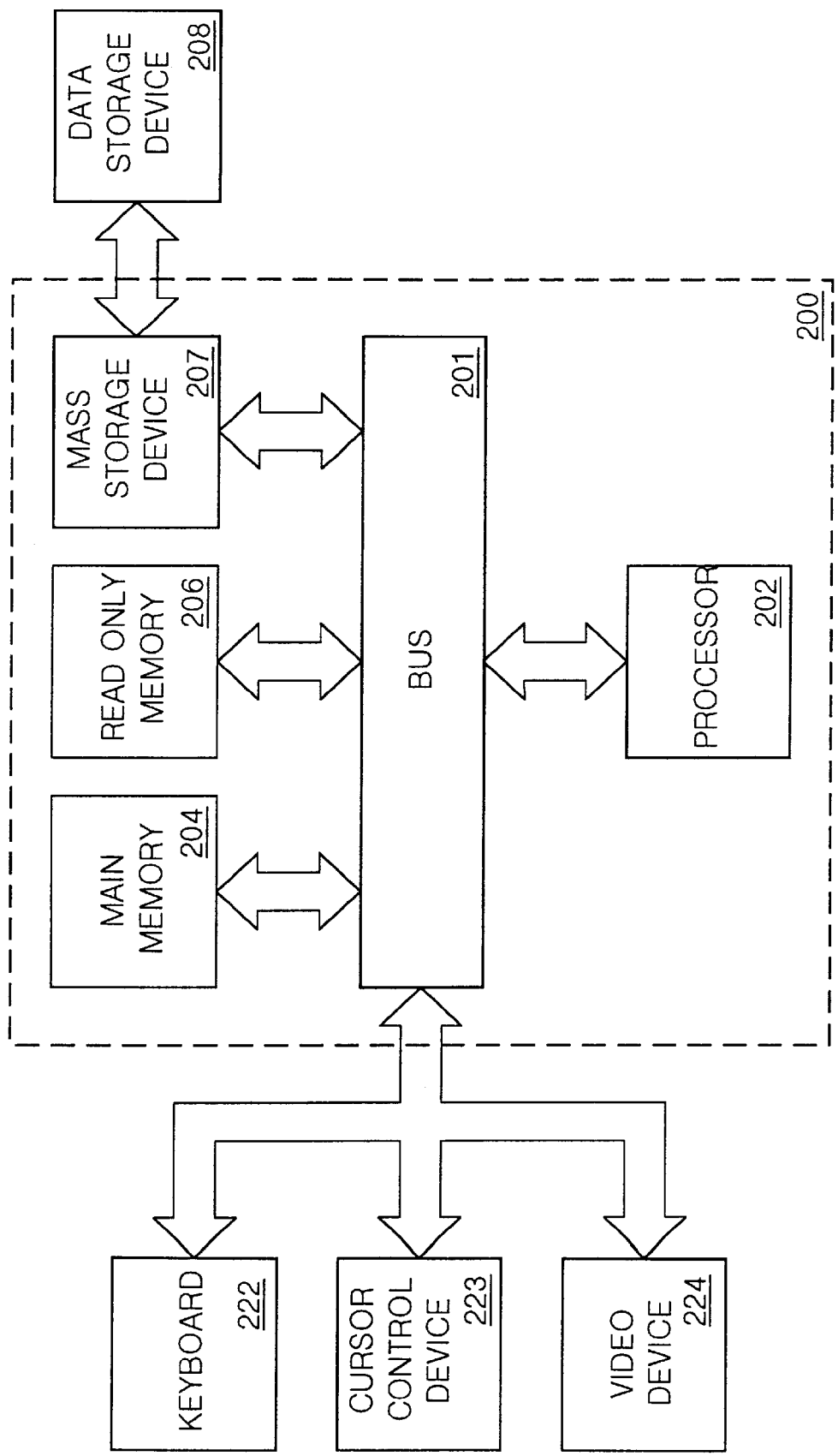
FIG. 2 illustrates a typical computer system 200 in which the present invention operates

FIG. 2 illustrates a typical computer system 200 in which the present invention operates. One embodiment of the present invention is implemented on a personal computer architecture. It will be apparent to those of ordinary skill in the art that other alternative computer system architectures may also be employed.

In general, such computer systems as illustrated by FIG. 2 comprise a bus 201 for communicating information, a processor 202 coupled with the bus 201 for processing information, main memory 203 coupled with the bus 201 for storing information and instructions for the processor 202, a read-only memory 204 coupled with the bus 201 for storing static information and instructions for the processor 202, a display device 205 coupled with the bus 201 for displaying information for a computer user, an input device 206 coupled with the bus 201 for communicating information and command selections to the processor 202, and a mass storage device 207, such as a magnetic disk and associated disk drive, coupled with the bus 201 for storing information and instructions. A data storage medium 208 containing digital information is configured to operate with mass storage device 207 to allow processor 202 access to the digital information on data storage medium 208 via bus 201.

Processor 202 may be any of a wide variety of general purpose processors or microprocessors such as the Pentium® processor manufactured by Intel® Corporation. It will be apparent to those of ordinary skill in the art, however, that other varieties of processors may also be used in a particular computer system. Display device 205 may be a liquid crystal device, cathode ray tube (CRT), or other suitable display device. Mass storage device 207 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 208 may be a hard disk, a floppy disk, a CD-ROM, a magnetic tape, or other magnetic or optical data storage medium.

In general, processor 202 retrieves processing instructions and data from a data storage medium 208 using mass storage device 207 and downloads this information into random access memory 203 for execution. Processor 202, then executes an instruction stream from random access memory 203 or read-only memory 204. Command selections and information input at input device 206 are used to direct the flow of instructions executed by processor 202. Equivalent input device 206 may also be a pointing device such as a conventional mouse or trackball device. The results of this processing execution are then displayed on display device 205.

Computer system 200 includes a network device 210 for connecting computer system 200 to a network. Network device 210 for connecting computer system 200 to the network includes Ethernet devices, phone jacks and satellite links. It will be apparent to one of ordinary skill in the art that other network devices may also be utilized.

OVERVIEW OF INVENTION

The present invention discloses a method for optimizing code based on resource sensitive hoisting and sinking. According to one embodiment of the present invention, instructions in code are scheduled for execution. As described above, each node in a data flow analysis framework is associated with a predetermined number of resources. The scheduling includes assigning these resources to instructions at the node. After each instruction has been assigned sufficient resources, the nodes are examined to determine whether any nodes have available resources. The nodes that have available resources are then marked as available for performing hoisting and sinking of instructions. This process is referred to herein as a "resource anticipability data flow analysis" for partial dead code elimination and "resource availability data flow analysis" for partial redundancy elimination.

According to one embodiment of the present invention, the resource anticipability/availability data flow analysis above is incorporated with traditional partial dead code elimination (PDE) and traditional partial redundancy elimination (PRE) techniques. According to an alternative embodiment, the resource anticipability/availability data flow analysis above is incorporated with a cost-benefit analysis based on path profiling. Yet another embodiment of the present invention incorporates the resource anticipability/availability data flow analysis with improved PDE and improved PRE techniques. PRE and PDE techniques are collectively referred to herein as "partial elimination" techniques. The following sections describe the use of the resource anticipability/availability data flow analysis in the context of PDE and PRE utilizing a cost-benefit analysis based on path profiling information. The same type of resource anticipability/availability data flow analysis may also be performed on other partial elimination techniques and may utilize other types of profiling techniques (described below).

A) Overview of Improved Approach to PDE and PRE

Use of predication for "sinking" (moving down) or speculation for "hoisting" (moving up) enlarges the potential scope of the optimization. Path profile information is utilized to determine the cost and benefit of exploiting speculation and predication to eliminate redundant or dead code. Predication and speculation are described in detail below. For the purposes of explanation, control flow graph representations of programs are utilized.

As described above, the traditional approach to both PRE and PDE performs hoisting or sinking code on a path only if the hoisting or sinking can be performed without adding additional instructions along any other path. Implicit in this formulation is the assumption that all paths through the program are equally important. In practice, however, it has been observed that some paths through a program are more frequently executed than others, and that many paths are never executed. In a recent study by T. Ball and J. Lazarus, "Efficient path profiling," Proceedings of MICRO-29, 1996, (hereinafter referred to as "Ball et al."), it was reported that for the SPEC95 integer benchmarks, the number of paths with non-zero execution frequency was fewer than 2300 in all except a couple of benchmarks, while the number of static paths through the benchmarks were in the millions.

According to one improved approach to PRE and PDE, "predication" and "speculation" are utilized to enlarge the potential scope of the optimization. Path profiling information is utilized to determine the cost and benefit of exploiting speculation and predication to eliminate redundant or dead code along frequently executed paths even if doing so introduces some additional instructions along infrequently executed paths. Predication is a technique that allows sinking of statements past merge points in situations where the statement is not executed on all paths leading to the merge point. The execution of the statement after sinking is predicated to ensure that it does not overwrite values of a variable in situations where control reaches the merge point along paths not containing the original location of the moved statement.

Speculation is the process of hosting expressions above "if" conditionals in situations where the expression is not "busy" at the "if" conditional. "Busy" in the context of this embodiment refers to a situation where an expression is found on all subpaths from a node. In other words, by performing hoisting, an expression which is conditionally executed prior to hoisting (below an "if"), is executed unconditionally after hoisting (above the "if"). Speculation of a hoisted instruction ensures that exceptions resulting from unconditional execution of the instruction only occur if the original conditions are met.

Two types of profiling are relevant to an embodiment of the present invention. "Edge profiling" tracks the number of times each edge in the program flow graph is traversed while "path profiling" tracks the number of times various acyclic paths in a program are traversed. In the study by Ball et al., it was determined that different path profiles may give rise to the same edge profiles. It is thus not possible to accurately identify frequently executed paths using edge profiles. Furthermore, the study by Ball et al. determined that path profile information can be collected accurately and efficiently. According to one embodiment, path profile information is used to determine cost-benefit information (described further below). Other profiling techniques, including edge profiling and "block profiling" may also be utilized to determine the cost-benefit information.

Figures 1C, 1D:
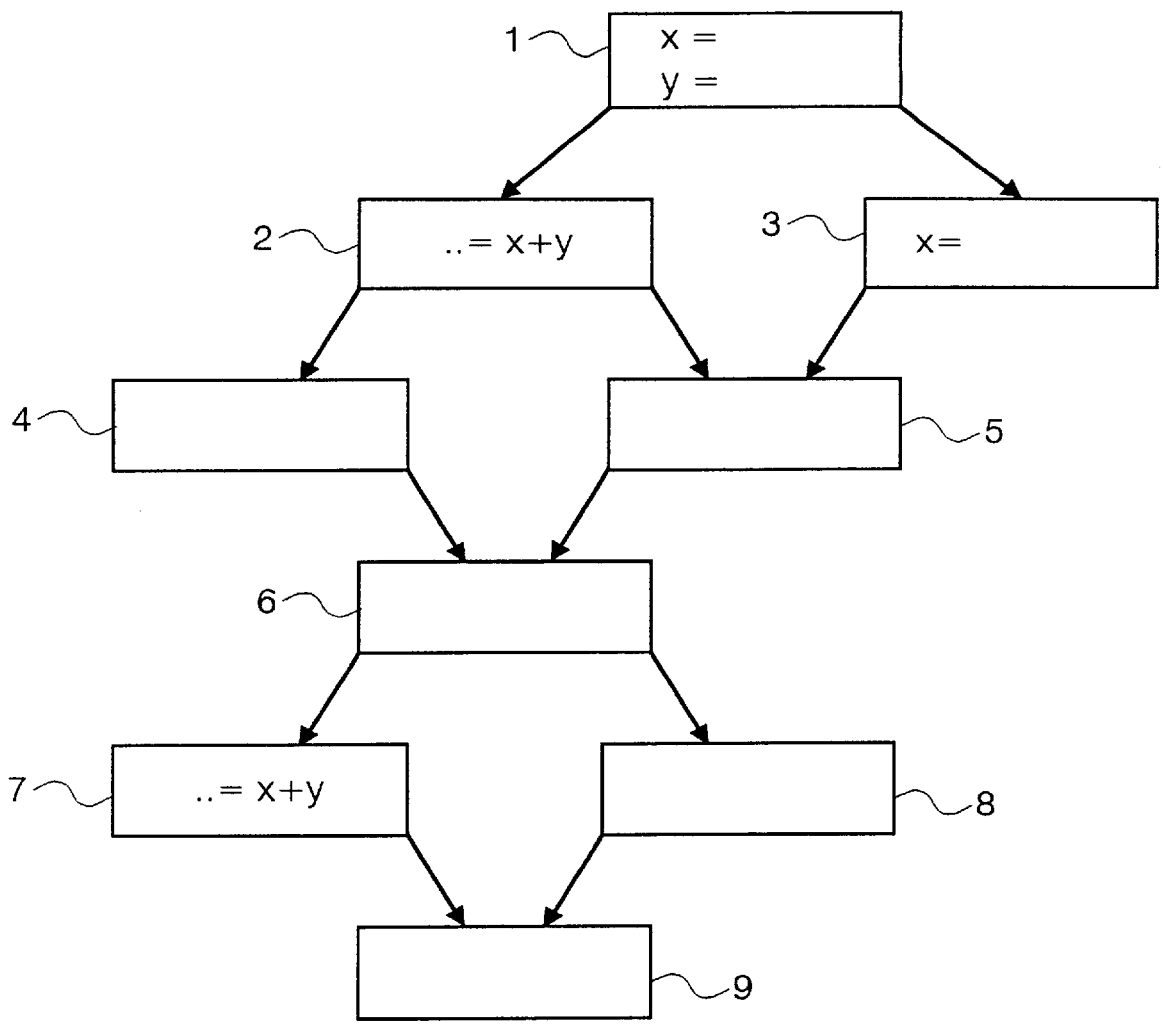
FIG. 1C illustrates an example of partially redundant code
FIG. 1D illustrates available paths for the flow diagram of FIG. 1C

FIGS. 3A–3D illustrate path profiling and cost-benefit information for each of the examples illustrated in FIGS. 1A and 1C. Specifically, FIGS. 3A–3D illustrate the various paths in a specific piece of code, and the frequency that each of these paths is executed. Utilizing this frequency information, a cost-benefit analysis is derived for each path. The following sections disclose algorithms to determine the cost and benefit for exploiting speculation and predication to eliminate partially redundant or partially dead code. These algorithms may also be modified to determine the cost and benefit associated with exploiting speculation and predication to make other types of optimizing changes in code. The correctness of the original program is retained while making these optimizing changes.

B) Partial Dead Code Elimination (PDE)

i) Details of Improved PDE

According to one embodiment of the present invention, PDE is performed by sinking partially dead assignments. Through sinking of a partially dead assignment, the dead assignment is moved to program points where resources required by the dead assignment are available, while at the same time removing the dead assignment from some paths along which is it dead. Cost benefit information derived from path profiles is used to determine the profitability of using predication enabled PDE elimination. A data flow analysis is performed to compute cost and benefit information at merge points. A modified sinking framework is then incorporated with a predication framework.

This modified sinking predication framework uses the cost-benefit information with respect to a statement to enable sinking of a partially dead statement past merge points where the benefit have been found to be greater than the cost. The cost of removing code is determined by identifying paths along which an additional execution of a statement is introduced. The sum of the execution frequencies of these paths is the measure of the cost. The benefit of removing code is determined by identifying paths along which addition redundancy elimination is enabled due to speculation. The sum of the execution frequencies of these paths is the measure of the benefit. Predication of a code statement is enabled where the benefit of predication enabled sinking is determined to be greater than the cost of predication enabled sinking.

Figure 4:
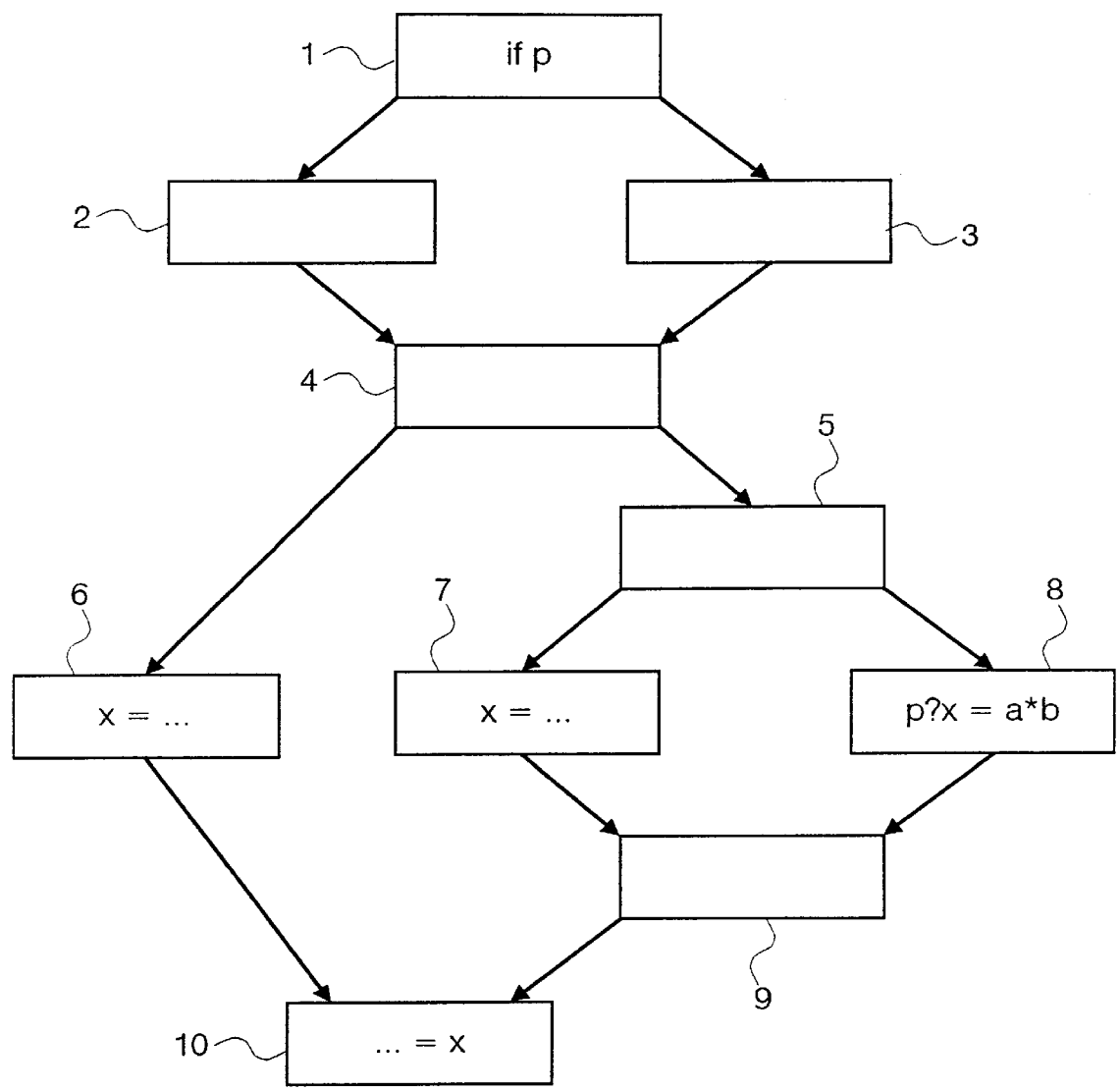
FIG. 4 illustrates sinking a statement in the example of FIG. 1A

FIG. 4 illustrates an example of sinking a statement by inserting the statement s: x=a+b:

Available subpaths which are program subpaths from the start node to n along which s is encountered and is sinkable to n; and Unavailable subpaths which are program subpaths from start node to n along which s is not available at n. These paths include those along which either s is not encountered or paths along which although s is encountered, s is not sinkable to n. The sinking of s to n can be blocked by a statement that is data dependent on n, namely by statements that reference x and statements that define a or b.

Program subpaths from n to the end of the program are also divided into two categories with respect to the statement s: x=a+b:

Removable subpaths which are subpaths from n to the end node along which variable x is not live at n and it is possible to eliminate the deadness of x along the path by sinking s and pushing it off the path; and Unremovable subpaths which are program subpaths from n to the end node along which either x is not dead or along which x's deadness cannot be eliminated because sinking s necessary to push x off the path is blocked.

The paths which benefit from sinking s past the merge point n are the paths along which dead code is removed. These are paths in the unoptimized flow graph along which the statement s is executed but the value of x computed is never used, and the dead code would not have been removed without sinking s past merge point n. These paths can be obtained by concatenating Available subpaths with Removable subpaths. The total benefit of predication enabled sinking of s past the merge point n is measured by summing up the execution frequencies of the paths statement into a block. A qualified predicate is then inserted to guard the statement. FIG. 4 illustrates sinking the evaluation of (x=a*b) (from FIG. 1A) below nodes 4 and 5, into node 8. While this sinking eliminates dead code along paths P1 and P2, it also introduced an additional evaluation along path P6. If the sum of the execution frequencies of paths P1 and P2 is greater than the execution frequency of path P5, then overall savings will result from predication enabled sinking. Although an additional instruction is executed along path 1.3.4.5.8.9.10, the qualified predicate ensures that the proper computations are still performed if the instruction is required. The execution of this additional instruction may require an additional cycle. The above optimization also requires that the result of evaluating predicate p in node 1 must be saved until node 8. According to one embodiment of the present invention, the predicates are stored in special predicate registers.

According to this embodiment, a data flow analysis is first performed for computing cost and benefit information at merge points. A modified sinking framework is then incorporated with predication. This modified framework uses the cost-benefit information with respect to a statement to enable sinking of a partially dead statement past merge points where the benefit of the sinking is determined to be greater than the cost.

Figure 5:
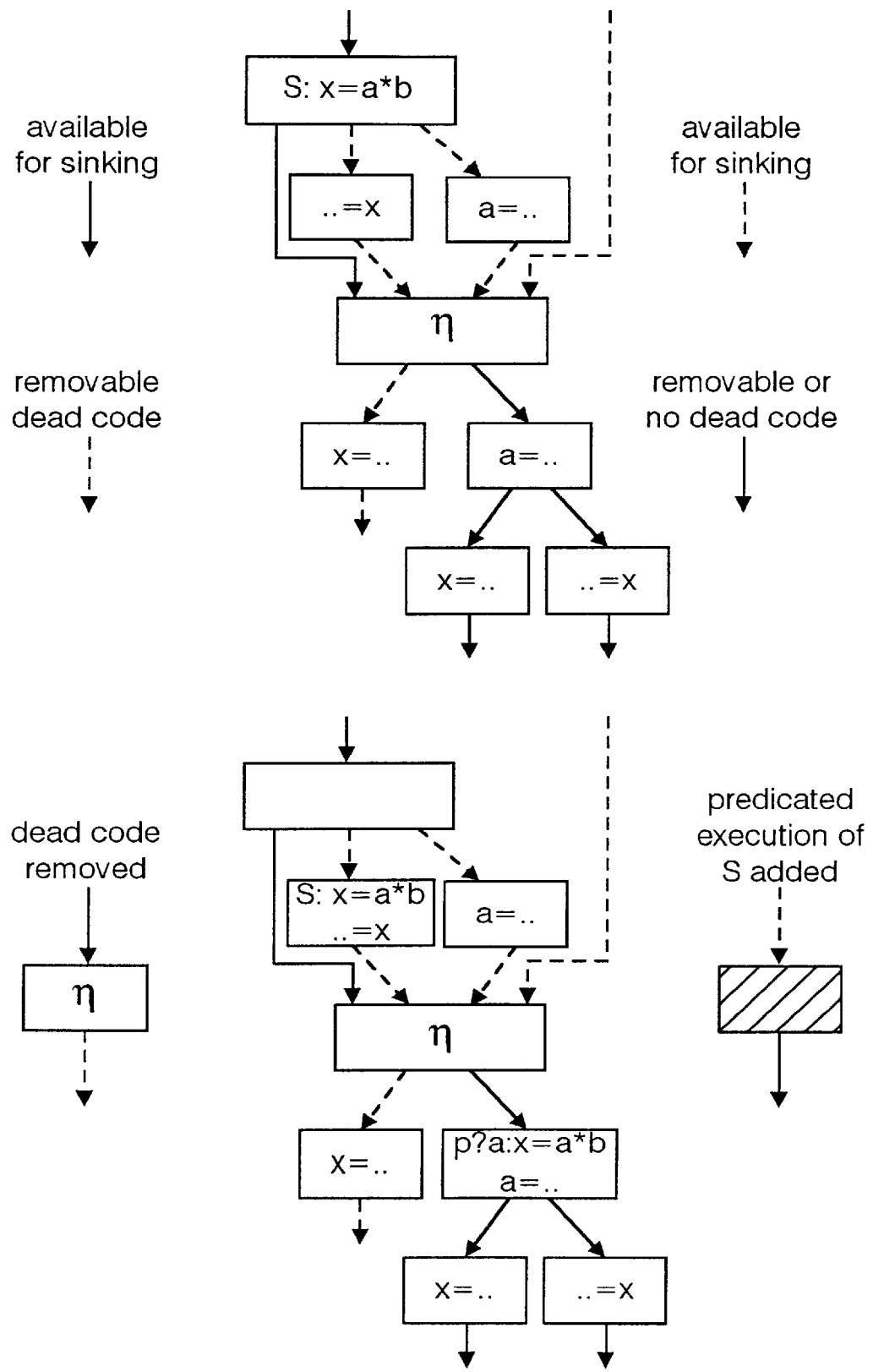
FIG. 5 illustrates an example of performing a cost-benefit analysis to determine whether to perform sinking of a statement past a merge point

FIG. 5 illustrates the various subpaths in a control flow graph that are used in a cost-benefit analysis according to one embodiment of the present invention. The analysis in this example is used to determine whether to perform sinking of a statements past a merge point n. To perform cost-benefit analysis for sinking of a statement past a merge point, the program subpaths that either originate or terminate at n must first be categorized. The subpaths from the start of the flow graph to the merge point n are divided into two categories with respect to the that benefit from the optimization.

As illustrated in FIG. 5, along the three paths starting at n, s is dead along two paths. Dead statement s can, however, be removed from one of the paths and not the other because sinking of s is blocked by the definition of a along the other path. There is also an Unavailable subpath from s to n along which the value of x computed by s is not used. The removal of dead code along this subpath, however, is not included in the benefit for merge point n because it can be derived without sinking s past the merge point n.

The paths which incur cost due to sinking of s past the merge point n are the paths in the flow graph along additional execution of a predicated version of statement s is encountered. These paths are obtained by concatenating unavailable subpaths with unremovable subpaths. The total cost of predication enabled sinking of s past the merge point n is measured by summing up the execution frequencies of the paths that incur a cost due to the optimization.

Given a path p that passes through a merge point n and a partially dead statement s, the statement s is available at n along path p if s is encountered along the subpath of p from start to n and there is no statement along the subpath of p from s to n that blocks the sinking of s to n. Otherwise statement s is unavailable at n along path p. Given a path p that passes through a merge point n and a partially dead statement s, the statement s is removable from path p if the value computed by s is not used along path p and it is possible to sink s to the earliest point along p at which s is fully dead (i.e. dead along all paths starting at that point). Otherwise statement s is unremovable from path p. Given a path p that passes through a partially dead statement s and a merge point n, the sinking of s past n benefits path p if s is available for sinking at n and s is removable along path p. The set of paths through n along which sinking of s is beneficial is denoted as $BenefitPaths_s(n)$. The benefit of predication enabled sinking of a statement s past a merge point n in an acyclic graph, denoted as $Benefit_s(n)$, is the sum of the execution frequencies of the paths in $Benefit_s(n)$ $$Benefit_s(n) = \sum_{p \in BenefitPaths_s(n)} Freq(p).$$

Given a path p that passes through a merge point n and a partially dead statement s, the sinking of s past n costs path p if s is unavailable for sinking at n and s is unremovable along path p. The set of paths through n along which sinking of s results in a cost is denoted as $CostPath_s(n)$. The cost of predication enabled sinking of a statement s past a merge point n in an acyclic graph, denoted as $Cost_s(n)$, is the sum of the execution frequencies of the paths in $CostPath_s(n)$.

$$Cost_s(n) = \sum_{p \in CostPaths_s(n)} Freq(p).$$

According to one embodiment of the present invention, in addition to computing the availability and removability of statements at program points, the set of paths along which these data flow values hold is also computed. The set of paths is represented by a bit vector in which each bit corresponds to a unique path from the entry to the exit of the acyclic flow graph. To facilitate the computation of sets of paths, with each node n in the flow graph, a bit vector OnPaths(n) where each bit corresponds to a unique path is associated and set to 1 if the node belongs to that path. Otherwise the bit vector is set to 0.

In performing availability analysis, $N\text{-}AVAIL_s(n)$ ($X\text{-}AVAIL_s(n)$) is a one bit variable which is 1 if there is a path through n along which s is available for sinking at n's entry(exit). Otherwise the variable value is 0. Forward data flow analysis with the or confluence operation is used to compute these values. At the entry point of the flow graph the availability value is set to 0. The availability value is changed to 1 when statement s is encountered, and it is set to 0 if a statement that blocks the sinking of s is encountered. $BLOCK_s(n)$ is a one bit variable which is 1(0) if n blocks s that is, n is data dependent upon s.

$N\text{-}APATHS_s(n)(X\text{-}APATHS_s(n))$ is a bit vector which holds the set of paths along which the value of $N\text{-}AVAIL_s(n)$ $(X\text{-}AVAIL_s(n))$ is 1 at n's entry(exit). At the entry to a node n for which $N\text{-}AVAIL_s(n)$ is 0, the set of paths is set to null (i.e. to $\vec{0}$). Otherwise the paths, in $N\text{-}APATHS_s(n)$ are computed by unioning the sets of paths along whichs is available at the exit of one of n's predecessors (i.e., unioning $X\text{-}APATHS_s(p)$, where p is a predecessor of n). In order to ensure that only paths that pass through n are considered, the result is intersected with OnPaths(n). The value of $X\text{-}APATHS_s(n)$ is OnPaths(n) if n contains s and $N\text{-}APATHS_s(n)$ if n does not block s.

In performing removability analysis, $N\text{-}REM_s(n)(X\text{-}REM_s(n))$ is a one bit variable associated with n's entry(exit) which is 1 if there is a path through n along which x is dead and any sinking of s that may be required to remove this deadness is feasible; otherwise its value is 0. Backward data flow analysis with the or confluence operation is used to compute these values. In order to ensure that the sinking of s is feasible the results of availability analysis computed previously are used. For example, if variable v computed by s is dead at n's exit, then $X\text{-}REM_s(n)$ is set to true only if $X\text{-}AVAIL(n)$ is true because the deadness can only be eliminated if sinking of s to n's exit is feasible. The results of availability analysis are similarly used in each data flow equation of removability analysis.

$N\text{-}RPATHS_v(n)(X\text{-}RPATHS_v(n))$ is a bit vector which holds the set of paths along which the value of $N\text{-}REM_s(n)$ $(X\text{-}REM_s(n))$ is 1 at n's entry(exit). At the entry(exit) of a node n for which $N\text{-}DEAD_v(n)(X\text{-}DEAD_v(n))$ and $N\text{-}AVAIL_s(n)(X\text{-}AVAIL_s(n))$ are 1, $N\text{-}RPATHS_s(n)(X\text{-}RPATHS_s(n))$ is set to OnPaths(n). Otherwise the paths in $X\text{-}RPATHS_s(n)$ are computed by unioning sets of paths along which x is partially dead and removable at the entry of one of n's successors (i.e., by unioning $N\text{-}RPATHS_s(p)$, where p is a successor of n). In order to ensure that only paths that pass through n are considered. The result is intersected with OnPaths (n).

In performing the cost and benefit computations below, $BENEFITPATHS_s(n)$ is a bit vector which holds the set of paths that benefit from predication enabled sinking of s past merge node n. The benefit is computed by intersecting the paths in $X\text{-}APATHS_s(n)$ with the paths in $X\text{-}RPATHS_s(n)$. $COSTPATHS_s(n)$ is a bit vector which holds the set of paths that incur a cost due to predication enabled sinking of s past merge node n. The cost is computed by intersecting the paths in $X\text{-}APATHS_s(n)$ with the paths in $X\text{-}LPATHS_s(n)$. The following equations perform a cost and benefit computation given a particular path profile:

$$N\text{-}AVAIL_s(n) = \begin{cases} 0 & \text{if } n = \text{entry} \\ \bigvee_{m \in Pred(n)} X\text{-}AVAIL_s(m) & \text{otherwise} \end{cases}$$

$$X\text{-}AVAIL_s(n) = \begin{cases} 1 & \text{if } s \in n \\ \overline{BLOCK_s(n)} \wedge N\text{-}AVAIL_s(n) & \text{otherwise} \end{cases}$$

$$N\text{-}APATHS_s(n) = \begin{cases} \vec{0} & \text{if } N\text{-}AVAIL_s(n) = 0 \\ OnPaths(n) \wedge \bigvee_{\substack{m \in Pred(n) \wedge \\ X\text{-}AVAIL_s(m) = 1}} X\text{-}APATHS_s(m) & \text{otherwise} \end{cases}$$

$$X\text{-}APATHS_s(n) = \begin{cases} OnPaths(n) & \text{if } s \in n \\ N\text{-}APATHS_s(n) & \text{if } X\text{-}AVAIL_s(n) = 0 \\ \vec{0} & \text{otherwise} \end{cases}$$

let V be the variable defined by s:

$$X\text{-}REM_s(n) = \begin{cases} X\text{-}AVAIL_s(n) & \text{if } X\text{-}DEAD_V(n) = 1 \\ X\text{-}AVAIL_s(n) \wedge \bigvee_{m \in Succ(n)} N\text{-}REM_s(m) & \text{otherwise} \end{cases}$$

-continued $$N\text{-}REM_s(n) = \begin{cases} N\text{-}AVAIL_s(n) & \text{if } N\text{-}DEAD_V(n) = 1 \\ N\text{-}AVAIL_s(n) \wedge X\text{-}REM_s(n) & \text{otherwise} \end{cases}$$

$$X\text{-}RPATHS_s(n) = \begin{cases} OnPaths(n) & \text{if } X\text{-}DEAD_V(n) \wedge X\text{-}AVAIL_s(n) = 1 \\ OnPaths(n) \wedge \bigvee_{\substack{m \in Succ(n) \wedge \\ N\text{-}REM_s(m) = 1}} N\text{-}RPATHS_s(m) & \text{otherwise} \end{cases}$$

$$N\text{-}RPATHS_s(n) = \begin{cases} OnPaths(n) & \text{if } N\text{-}DEAD_V(n) \wedge N\text{-}AVAIL_s(n) = 1 \\ X\text{-}RPATHS_s(n) & \text{if } N\text{-}REM_s(n) = 1 \\ \vec{0} & \text{otherwise} \end{cases}$$

$\forall n$ such that n is a merge point:

$$BENEFITPATHS_s(n) = X\text{-}RPATHS_s(n) \wedge X\text{-}APATHS_s(n)$$

$$BENEFIT_s(n) = \sum_i BENEFITPATHS_s(n)(i) \times FREQ(path(i))$$

$$COSTPATHS_s(n) = \overline{X\text{-}RPATHS_s(n)} \wedge \overline{X\text{-}APATHS_s(n)}$$

$$COST_s(n) = \sum_i COSTPATHS_s(n)(i) \times FREQ(path(i))$$

According to one embodiment of the present invention, the expense of cost-benefit analysis can be limited by ignoring paths that have very low execution. Ignoring the low frequency paths will result in approximate cost-benefit information. The Estimates of cost and benefit computed according to this embodiment are conservative, i.e., the estimated cost is never lower than the true cost and the estimated benefit is never higher than the true benefit, where true cost and benefits are obtained by considering all paths. In FIGS. 1A–1B, assuming paths through node 7 are ignored during a cost-benefit analysis, conservative analysis will make the worst case assumptions regarding this node by assuming that when predication enabled sinking of x=a*b is performed at node 4, no benefits are derived and cost is incurred along the paths through node 8. In other words, the analysis will assume that along path P2 no dead code is removed and along path P5 a predicated version of statement x=a*b is introduced.

Paths HighPaths and LowPaths in the following equations represent the high frequency and low frequency paths. The $CostPaths_s$ and $BenefitPaths_s$ information is computed only for the high frequency paths. Thus, in computing the cost at node n, a conservative estimate is obtained by assuming that predicated versions of s is placed along all paths in Low-Paths that contain n. In computing the conservative estimate of the benefit, according to this embodiment, the assumption is that dead code removal is not achieved for s along any of the paths in LowPaths.

$$Cost_s(n) \leq EstCost_s(n) = \sum_{p \in HighPaths} CostPaths_{exp(n)}(p) \times Freq(p) + \sum_{\substack{p \in LowPaths \\ \wedge n \in p}}^{Total} Freq(p)$$

$$Benefit_{exp}(n) \geq EstBenefit_{exp}(n) = \sum_{p \in HighPaths} BenefitPaths_{exp(n)}(p) \times Freq(p)$$

According to one embodiment of the present invention, predication enabled sinking is performed within an acyclic graph if it is beneficial with respect to the profiles for that acyclic graph. In order to achieve beneficial sinking of statements across loop boundaries, statements may be moved across loop boundaries. The benefit of the optimization must be estimated by considering the paths within the loop boundaries while the cost of the optimization is based upon paths both inside and outside the loop.

Figure 6:
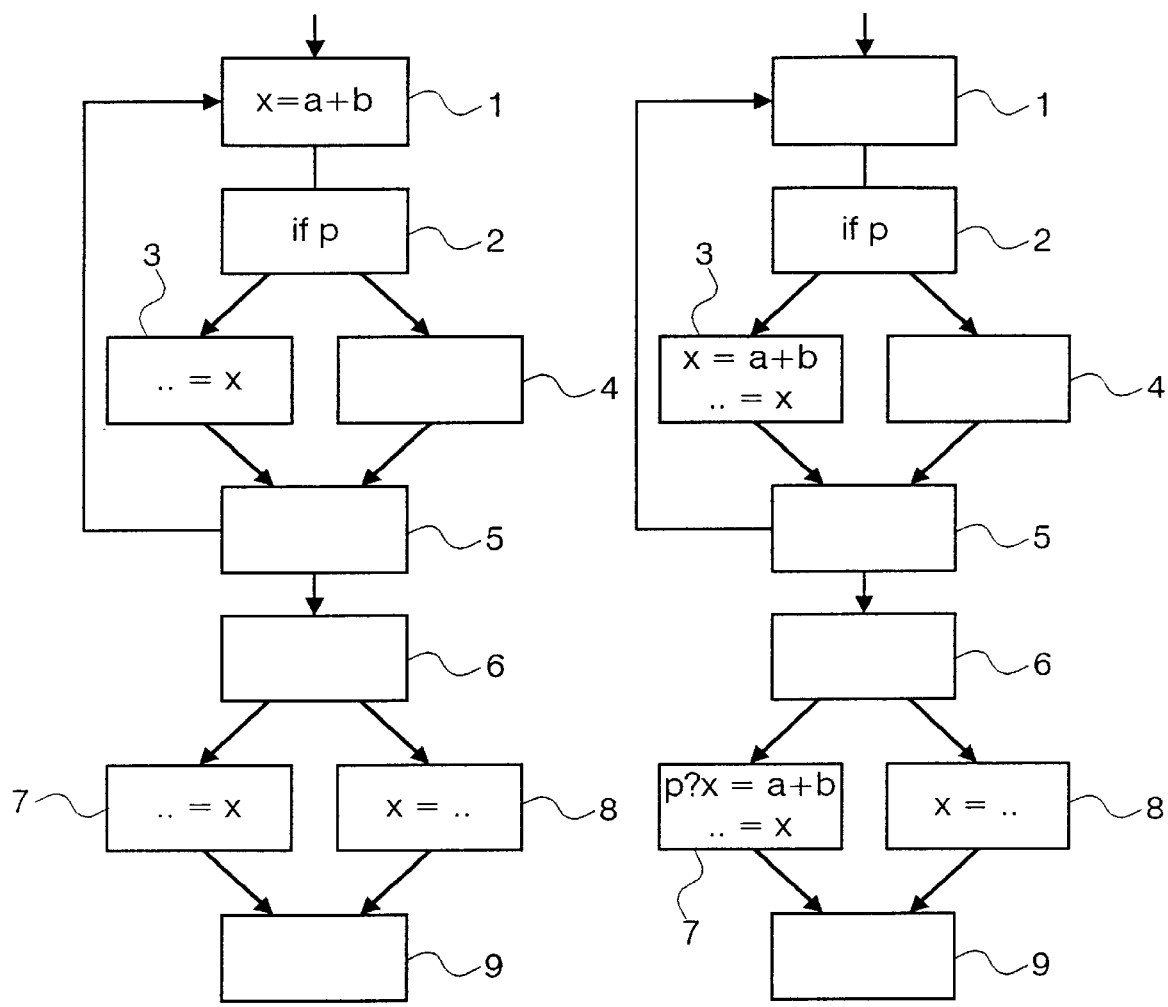
FIG. 6 illustrates the movement of partially dead statement in out of a loop

FIG. 6 illustrates the movement of a partially dead statement out of a loop. The benefit of the optimization results from the removal of x=a*b along the path 1.2.4.5 within the loop and the cost of optimization results from the placement of predicated execution of x=a*b along path 6.7.9. If the path 1.2.4.5 is executed frequently while the path 6.7.9 is executed infrequently it is beneficial to apply this optimization. In this example, x is not live along the loop back edge (i.e., at the entry of the loop). If x was live along the loop back edge, a copy of the statement would have to be placed along the loop back edge and the sinking beyond node 5 is not beneficial.

According to one embodiment of the present invention, the optimization past a merge point that is a loop exit as well as the tail of the loop is enabled if the following conditions hold:

$$\text{Benefit}_{x=\exp}(\text{tailexit}) > \text{Cost}_{x=\exp}(\text{tailexit}), \text{ where}$$

$$\text{Benefit}_{x=\exp}(\text{tailexit}) = \sum_{p \in \text{X-APATHS}_{x=\exp}(\text{tailexit})} \text{Freq}(p),$$

$$\text{Cost}_{x=\exp}(\text{tailexit}) = \sum_{p \in \text{N-LPATHS}_x(\text{postexit})} \text{Freq}(p), \text{ and}$$

$$\text{N-LIVE}_x(\text{head}) = 0.$$

According to this embodiment, the partial dead code elimination framework developed by J. Knoop, O. Ruthing and B. Steffen, "Partial Dead Code Elimination," in the Proceedings of The Conference on Programming Language Design and Implementation, pages 147–158, 1994 (hereinafter referred to as "Knoop et al.") is extended. Knoop et al.'s framework involves two main steps that are applied repeatedly until optimization is no longer possible. The first step performs assignment sinking to enable dead code elimination and the second step performs assignment elimination to remove dead code. The extended framework according to one embodiment of the present invention consists of three steps. The first step, enable predication, performs predication-based sinking at join points in the flow graph based upon the results of cost-benefit analysis. Knoop et al. do not perform such a cost-benefit analysis. The second step performs assignment sinking comprising the standard sinking enabled by the Knoop et al. framework as well as additional sinking enabled by predication. The final step of assignment elimination remains unchanged from the Knoop et al. algorithm.

According to one embodiment, the following equations allow for predication enabled sinking at join nodes at which the cost of sinking is less than the benefit derived from sinking. Additionally, sinking is also enabled at a join node if it has been enabled at an earlier join node. This is to ensure that the benefits of sinking computed for the earlier join node can be fully realized. The assignment sinking analysis consists of two steps, namely delayability analysis which performs sinking and insertion point computation that identifies, the points to which the statement must be placed following sinking. The delayability analysis has been modified to allow predication enabled sinking.

Enabling Predication $$\text{EPRED}_s(n) = \begin{cases} 1 & \text{if COST}_s(n) < \text{BENEFIT}_s(n) \text{ and} \\ 0 & \text{otherwise} \end{cases}$$

$$\text{EPRED}_s(n) = \text{N-REM}_s(n) \wedge \bigvee_{m \in \text{Pred}(n)} \text{EPRED}_s(m)$$

$$\text{EPREDJOIN}_s(n) = \begin{cases} \text{EPRED}_s(n) & \text{if n is a join point} \\ 0 & \text{otherwise} \end{cases}$$

Delayability Analysis $$\text{X-DELAYED}_s(n) = \begin{cases} 1 & \text{if } s \in n \\ \text{N-DELAYED}_s(n) \wedge \overline{\text{BLOCK}_s(n)} & \text{otherwise} \end{cases}$$

$$\text{N-DELAYED}_s(n) = \begin{cases} 0 & \text{if n = start} \\ \text{EPREDJOIN}_s(n) \vee \bigwedge_{m \in \text{Pred}(n)} \text{X-DELAYED}_s(m) & \text{otherwise} \end{cases}$$

Insertion Points:

$$\text{X-INSERT}_s(n) = \text{X-DELAYED}_s(n) \wedge \bigvee_{m \in \text{Succ}(n)} \overline{\text{N-DELAYED}_s(m)}$$

$$\text{N-INSERT}_s(n) = \text{N-DELAYED}_s(n) \wedge \text{BLOCK}_s(n)$$

ii) Resource Anticipability Data Flow Analysis for PDE

According to this embodiment, a data flow analysis and a resource anticipability data flow analysis are first performed for computing cost and benefit information at merge points. Based on the above description of code sinking and cost benefit analysis, the following is a description of one embodiment of the present invention that takes resource anticipability data flow analysis information into account. Further details of performing predication and sinking of code using a cost-benefit data flow analysis based on path profiling information can be found in co-pending application having Ser. No. 08/853,275, filed on May 9, 1997, entitled "Optimizing Code Using A Cost-Benefit Data Flow Analysis Based On Path Profiling Information."

Figure 7:
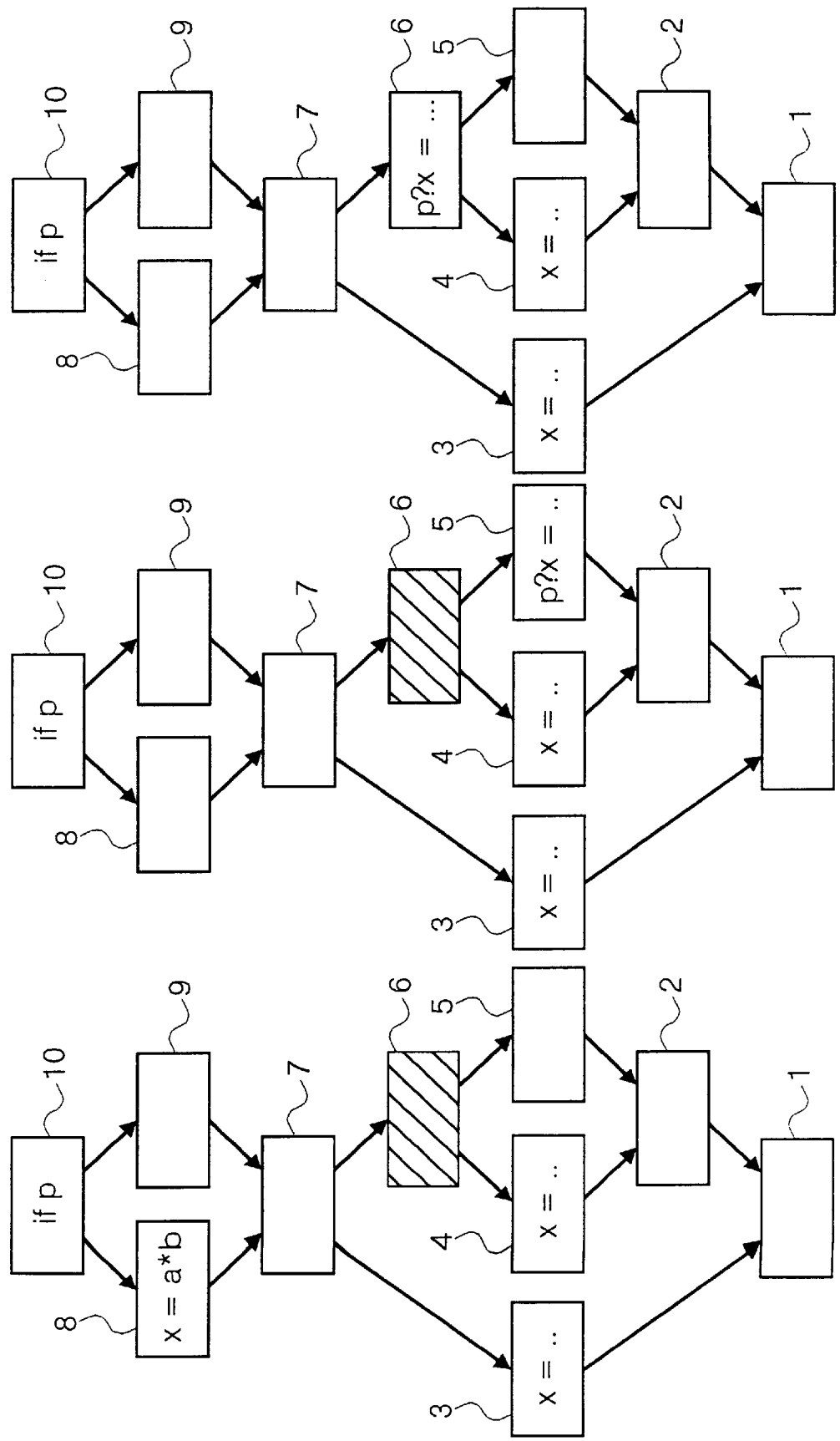
FIG. 7 illustrates one embodiment of the present invention that takes resource anticipability data flow analysis information into account when performing PDE

In FIG. 7, if the functional unit for the multiply operation is expected to be busy at node 5 and idle at node 6, resource sensitive sinking will place the statement at node 6. As before, the predication of the statement is required to perform sinking past node 7. The sinking past 7 is only performed, however, if the frequency with which the path 1.3.7.8.10 (along which dead code is eliminated) is executed is greater than the frequency with which the subpath 6.7.9.10 (along which an additional instruction is introduced) and eliminated as much deadness as possible in the process.

The resource anticipatability data flow analysis determines the nodes past which sinking of an assignment a will not be inhibited by the lack of resources. A functional unit resource required to execute an assignment statement a is anticipatable at the entry of a node n if for each path p from n's entry to the end node one of the following conditions is true:

the value of the variable defined by a at n's entry is dead along path p; or

∃ a node b along p in which the required resource is locally available and statement a is sinkable to b.

To perform resource anticipatability analysis for an assignment a, the following data flow variable is associated with each node:

$PRES_a(n)$ is 1 if given that the resource required by a is anticipatable at n's exit, it is also anticipatable at n's entry; otherwise it is 0. In particular, $PRES_a(n)$ is 1 if the statement in n does not define a variable referenced (defined or used) by a.

$DEAD_a(n)$ is 1 if the variable defined by a is dead at n's entry (i.e., the variable at n's entry is never used). If the variable is not dead, the value of $DEAD_a(n)$ is 0.

$FREE_a(n)$ is 1 if the resource required by a is free for a's use if a is moved to n through sinking; otherwise it is 0.

$X\text{-}RANTI_a(n)$ ($N\text{-}RANTI_a(n)$) is 1 if the resource required by a is anticipatable at n's exit (entry); otherwise it is 0.

Backward data flow analysis is performed with the and confluence operator as shown in the following equations:

$$X\text{-}RANTI_a(n) = \bigwedge_{m \in Succ(n)} N\text{-}RANTI_a(m)$$

$$N\text{-}RANTI_a(n) = \left(X\text{-}RANTI_a(n) \wedge PRES_a(n)\right) \vee DEAD_a(n) \vee FREE_a(n)$$

The resource used by a is anticipatable at n's exit if it is anticipatable at the entries of all successors of n. The resource is anticipatable at n's entry if the resource is free for use by a in n, or the variable defined by a is dead at n's entry, or the resource is anticipatable at n's exit and preserved through n.

The assignment sinking and PDE framework according to one embodiment is a modification of the framework developed by Knoop et al. PDE is performed in two steps: assignment sinking followed by assignment elimination. The first step is modified to incorporate resource anticipatability information while the second step remains unchanged. This framework is applicable to an embodiment of the present invention that utilizes a traditional PDE technique (as described in Knoop et al., for example) as well as to an alternate embodiment that utilizes the improved PDE technique described above. Assignment sinking consists of delayability analysis followed by identification of insertion points for the statement being moved. Delayability analysis only allows sinking of a along a path if the resource required by a is anticipatable along the path.

$$X\text{-}DELAYED_a(n) = \begin{cases} 1 & \text{if } a \in n \\ N\text{-}DELAYED_a(n) \wedge \overline{BLOCKED_a(n)} & \text{otherwise} \end{cases}$$

$$N\text{-}DELAYED_a(n) = \begin{cases} 0 & \text{if } n = \text{start} \\ N\text{-}RANTI_a(n) \wedge \bigwedge_{m \in Pred(n)} X\text{-}DELAYED_a(m) & \text{otherwise} \end{cases}$$

C) Partial Redundancy Elimination (PRE)

i) Details of Improved PRE

PRE is performed by hoisting expression evaluations. Through hoisting of a partially redundant expression, the expression is migrated to program points where resources required by the expression are available, while at the same time removing the expression evaluation from some paths along which the expression is computed multiple times.

A modified busy code motion framework is developed that incorporates speculation with cost benefit information. This modified framework uses the cost-benefit information with respect to an expression to enable hoisting of that expression past conditionals where the benefit has been found to be greater than the cost. The cost of enabling speculation of an expression is determined by identifying paths along which an additional evaluation of an expression is introduced. The sum of the execution frequencies of these paths is the measure of the cost. The benefit of enabling speculation is determined by identifying paths along which additional redundancy elimination is enabled due to speculation. The sum of execution frequencies of these paths is the measure of the benefit. Speculation is allowed where the benefit of speculation is determined to be greater than the cost of speculation.

Figure 8:
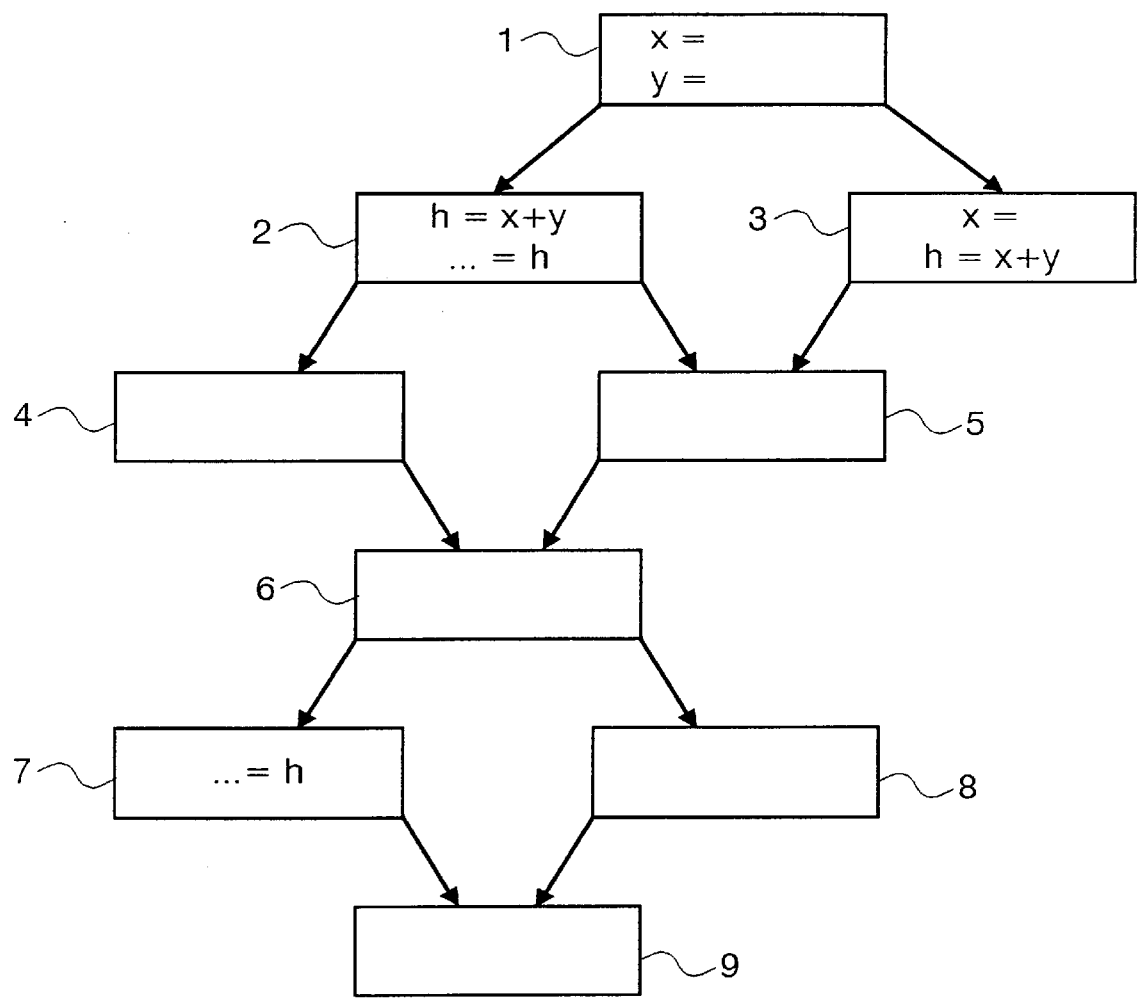
FIG. 8 illustrates an example of hoisting a statement in the example of FIG. 1C

FIG. 8 illustrates an example of hoisting a statement using speculation. Specifically, FIG. 8 illustrates the evaluation of (x+y) (from FIG. 1C) hoisted above node 6 and placed at node 3. Performing speculation in this manner thus removes the redundancy along paths P1 and P2. This removal of redundancy is deemed to be the benefit of enabling speculation at node 6. The hoisting of the expression (x+y) has also, however, introduced an additional evaluation along path P5. This additional evaluation is deemed to be the cost of enabling speculation at node 6. The path profile information for this example, illustrated in FIG. 3B, indicates that the total number of times path P1 and P2 are executed is expected to be greater than the number of times path P5 is executed. In the example illustrated in FIG. 8 therefore, the expected number of evaluations of (x+y) is reduced by 110, namely:

(FreqP1+FreqP2−FreqP5)=100+100−90=110

The benefit derived from speculation at node 6 is thus greater than the cost of allowing such speculation and the speculation is performed. According to one embodiment of the present invention, speculation is integrated with the busy code motion framework proposed by B. Steffen, "Data Flow Analysis as Model Checking," Proceedings TACS'91, Sendei, Japan, Springer-Verlag, LNCS 526, pages 346–364, 1991 (hereinafter referred to as "Steffen") is extended to perform PRE. The original analysis by Steffen consists of a backward data flow analysis phase followed by a forward data flow analysis phase. Backward data flow is used to identify all down-safe points, that is, points to which expression evaluations can be safely hoisted. Forward data flow analysis identifies the earliest points at which expression evaluations can be placed. Finally, the expression evaluations are placed at points that are both earliest and down-safe.

Figure 9:
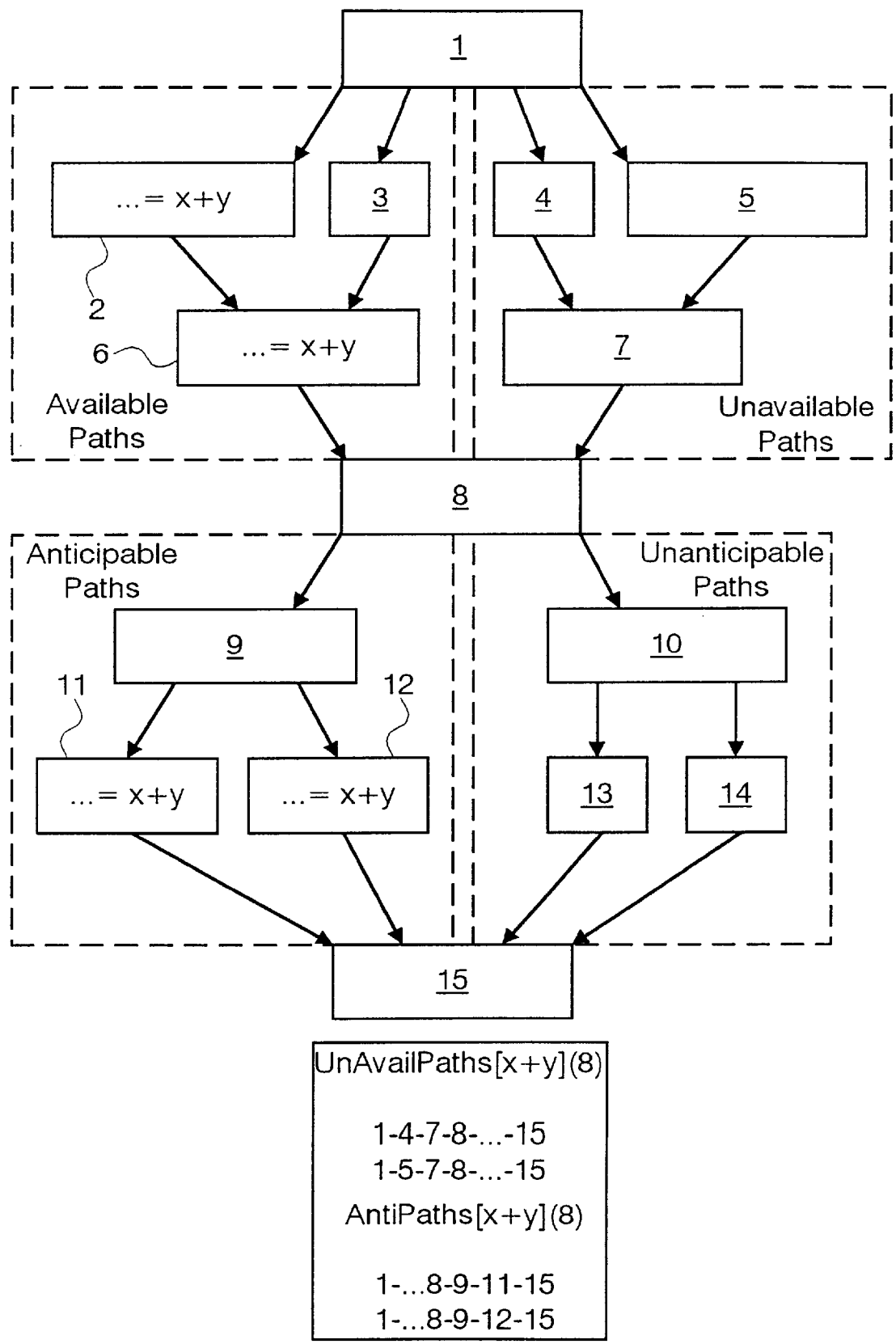
FIG. 9 illustrates a cost-benefit analysis of speculating an expression

FIG. 9 illustrates a cost-benefit analysis of speculating an expression x+y at node 8. As illustrated, the paths that pass through n are divided into two categories: paths along which x+y is available at n and paths along which x+y is unavailable at node 8 in the original program (i.e., prior to code speculation and code hoisting). After speculation and code hoisting is applied, x+y will be available at node 9 along all paths leading to that node. Thus, new evaluations of x+y would be placed along the paths containing node 8 along which x+y was originally unavailable at node 8. As shown in FIG. 9, these paths include all those paths that start by taking the subpath 1.4.7.8 or 1.5.7.8. The new evaluations of x+y represent the cost of speculation. The total cost is computed by summing up the execution frequencies of the paths along which new evaluations of x+y are introduced.

After speculation x+y is available at n along all paths to n, the later evaluations of x+y along paths from n may become unnecessary if x+y is still available at those evaluations. By identifying all paths along which later evaluations of x+y become unnecessary, the benefit of speculation is determined. These paths are the ones along which the evaluation of x+y is anticipatable at n. Anticipatable paths include all those paths which contain the subpaths 8.9.11.15 or 8.9.12.15. The total benefit is computed by summing up the execution frequencies of the paths along which new evaluations of x+y are eliminated due to speculation at node 8.

Expression exp is uravailable at n's exit along a path containing n if either exp is not evaluated along the path prior to reaching the exit of n, or if exp is evaluated prior to reaching n and expression exp is killed before reaching n's exit. The set of paths through n along which exp is unavailable at n's exit is denoted as UnAvailPaths exp (n). The cost of speculation of an expression exp at a condition node n in an acyclic graph, denoted as $Cost_{exp}(n)$, is the sum of the execution frequencies of the subset of paths through n along which exp is unavailable at n's exit:

$$Cost_{exp}(n) = \sum_{p \in UnAvailPaths} Freq(p)$$

The expression exp is anticipatable at n's entry along a path containing n if exp is evaluated along the subpath starting from the entry of node n and no variable used in exp is redefined along the path prior to the expression's evaluation. The set of paths through n along which exp is anticipatable at n's entry is denoted as $AntiPaths_{exp}(n)$.

The benefit of speculation of an expression exp at a conditional node n in an acyclic graph, denoted as:

$$Benefit_{exp}(n) = \sum_{p \in AntiPaths(n)} Freq(p)$$

If an expression is available at nodes along each path leading to that node's exit, then the cost of speculation at that node will be zero because no additional executions of the expression will be introduced. Additionally, the benefit of speculation at a node is zero if the expression being considered is not anticipatable at that node along any path (e.g., a variable used by the expression may be defined in the node).

According to one embodiment of the present invention, in addition to computing data flow values at program points, the set of paths along which these data flow values hold is also computed. The set of paths is represented by a bit vector in which each bit corresponds to a unique path from the entry to the exit of the acyclic flow graph. To facilitate the computation of sets of paths, with each node n in the flow graph, a bit vector OnPaths(n) where each bit corresponds to a unique path is associated and set to 1 if the node belongs to that path. Otherwise the bit vector is set to 0.

To compute the cost, the following one bit variables are associated with each node: $Kill_{exp}(n)$ which is 1(0) if n kills(preserves) exp; $NotUsed_{exp}(n)$ which is 0(1) if n computes (does not compute) exp; and $MayUnAvail_{exp}(n)$ which is 1 if there is a path from the start node to n's exit along which exp is unavailable at n's exit; otherwise it is 0. The computation of $MayUnAvail_{exp}(n)$ is performed using forward any-path data flow analysis. In addition to computing the values of $MayUnAvail_{exp}$, at the nodes where MayUnAvail$_{exp}$ is 1, the subset of paths through the acyclic flow graph along which $MayUnAvail_{exp}$ is 1 is also computed. This set of paths is denoted as $UnAvailPaths_{exp}$. If exp is available at n's exit along all paths (that is, $MayUnAvail_{exp}$ (n)=0) then $UnAvailPaths_{exp}$ is nil ($\vec{0}$). If a node n kills the expression exp, then exp is considered to be unavailable at n's exit along all paths through n, that is, all paths in OnPaths(n). Otherwise, if exp is unavailable at n's exit, then the set paths along which it is unavailable is obtained by unioning the sets of paths along which exp is unavailable at the exit's of predecessors of n. In order to ensure that only paths that pass through n are considered, the result is intersected with OnPaths(n). Once the set of unavailable paths for a conditional node has been obtained, the frequencies of these paths are added together to obtain cost of speculation at that node.

$$MayUnAvail_{exp}(n) = \begin{cases} 0 & \text{(if } n = \text{entry)} \\ Kill_{exp}(n) \lor (NotUsed_{exp}(n) \land \bigvee_{m \in Pred(n)} MayUnAvail_{exp}(m)) & \text{otherwise} \end{cases}$$

$$UnAvailPaths_{exp}(n) = \begin{cases} \vec{0} & \text{if } MayUnAvail_{exp}(n) = 0 \\ O\ nPaths(n) & \text{if } Kill_{exp}(n) = 1 \\ O\ nPaths(n) \land \bigvee_{\substack{m \in Pred(n) \land \\ MayUnAvailexp(m) = 1}} UnAvailPaths_{exp}(m) & \text{otherwise} \end{cases}$$

$$\forall n \text{ such that } n \text{ is a conditional, } Cost_{exp}(n) = \sum_i UnAvailPaths_{exp}(n)(i) \times Frequency(path(i))$$

To compute the benefit, backward any-path analysis is performed to determine whether exp is anticipatable at various nodes in the program. In the equations given below, $$MayAnti_{exp}(n) = \begin{cases} 0 & \text{if } n = \text{exit} \\ Used_{exp}(n) \lor (Pres_{exp}(n) \land \bigvee_{m \in Succ(n)} MayAnti_{exp}(m)) & \text{otherwise} \end{cases}$$

$$UnAvailPaths_{exp}(n) = \begin{cases} \vec{0} & \text{if } MayUnAvail_{exp}(n) = 0 \\ O\ nPaths(n) & \text{if } Kill_{exp}(n) = 1 \\ O\ nPaths(n) \land \bigvee_{\substack{m \in Pred(n) \land \\ MayUnAvailexp(m) = 1}} UnAvailPaths_{exp}(m) & \text{otherwise} \end{cases}$$

$$\forall n \text{ such that } n \text{ is a conditional, } Benefit_{exp}(n) = \sum_i MayAntiPaths_{exp}(n)(i) \times Frequency(path(i))$$

$Pres_{exp}(n)$ is 1(0) if n preserves(kills) exp; $Used_{exp}(n)$ is 1 if exp is computed in n and 0 otherwise. $MayAnti_{exp}(n)$ is 1 if exp is anticipatable at n's entry along some path otherwise it is 0. If at node n exp is not anticipatable along any path (i.e., $MayAnti_{exp}(n)=0$), then $MayAntiPaths_{exp}(n)$ is null. If a node n uses the expression exp, the exp is considered to be anticipatable at n's entry along all paths through n, (i.e. all paths in OnPaths(n)). Otherwise, if exp is anticipatable at n's entry, then the set of paths along which it is anticipatable is obtained by unioning the sets of paths along which exp is anticipatable at the entries of successors of n. In order to ensure that only those paths that pass through n are considered, the result is intersected with OnPaths (n).

The results of the above analysis are shown in the table in FIG. 3B. The analysis determines that, the expression x+y is unavailable at node 6 along paths P4 and P5 and hence the value of $Cost_{x+y}(6)$ is 150. Furthermore x+y is anticipatable at node 6 along paths P1, P2, and P4 and therefore the value of $Benefit_{x+y}(6)$ is 260. The savings resulting from speculation at node 6 is thus 110.

According to one embodiment of the present invention, the optimization described in the preceding section performs speculation within an acyclic graph if the speculation is beneficial with respect to the profile for that acyclic graph. In order to achieve beneficial speculative movement of expressions across loop boundaries, however, further modifications to the above description are required.

Figure 10:
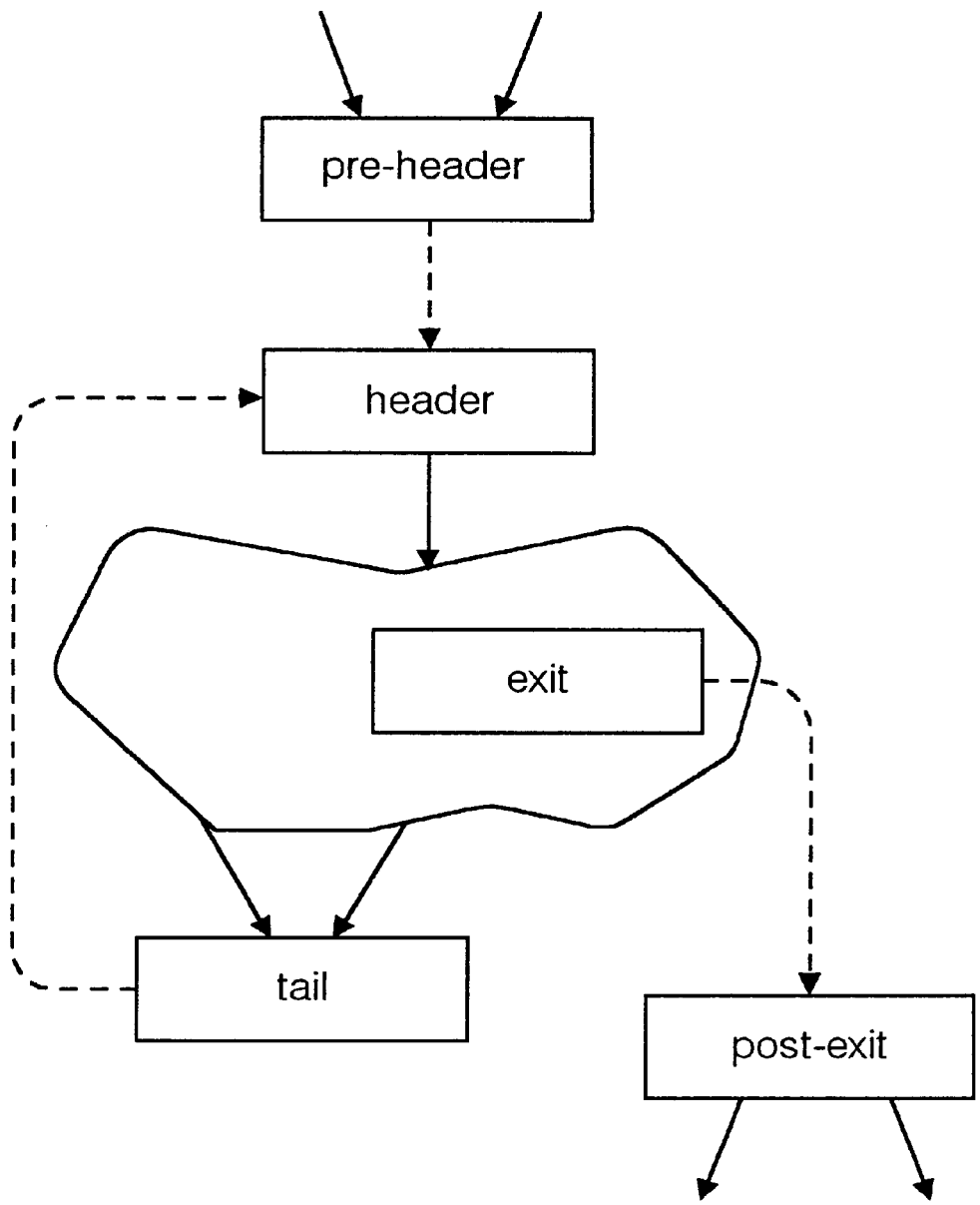
FIG. 10 illustrates the movement of hoisting a partially redundant statement out of a loop

As illustrated in FIG. 10, the dashed lines indicate the edges that are ignored during initial cost-benefit analysis. The exclusion of these edges results in an acyclic graph corresponding to the code before the loop, after the loop, and the loop body. The propagation of an expression to the loop header and then the loop pre-header is based upon the comparison of the cost of propagating the expression at the pre-header with the benefit of propagating the expression at the loop header. This comparison enables consideration of the benefits of moving an expression out of a loop. In the case where the loop header is also a loop exit, the benefit of expression propagation at the target of the exit should also be considered.

The costs of propagating to the header and post-exit nodes and the benefits of propagating to the pre-header and exit nodes are therefore also adjusted, as shown in FIG. 10. The loop header is also the loop exit and the analysis indicates that enabling speculation at the loop header is beneficial (i.e., $Cost_{x+y}(5) < Benefit_{x+y}(5)$).

The cost-benefit analysis of individual acyclic graphs is not performed separately. Instead, the analysis over the entire program is performed simultaneously with respect to a given expression. The edges that cross loop boundaries are simply ignored during this analysis phase. Furthermore, the MayUnAvail and MayAnti values for all expression can be simultaneously computed by using bit vectors in which each bit corresponds to a unique expression.

The expense of cost-benefit analysis can be limited by ignoring paths that have very low execution. Ignoring the low frequency paths will result in approximate cost-benefit information. The estimates of cost and benefit computed using this approach are thus conservative (i.e., the estimated cost is never lower than the true cost and the estimated benefit is never higher than the true benefit, where true cost and benefits are obtained by considering all paths).

Figure 11:
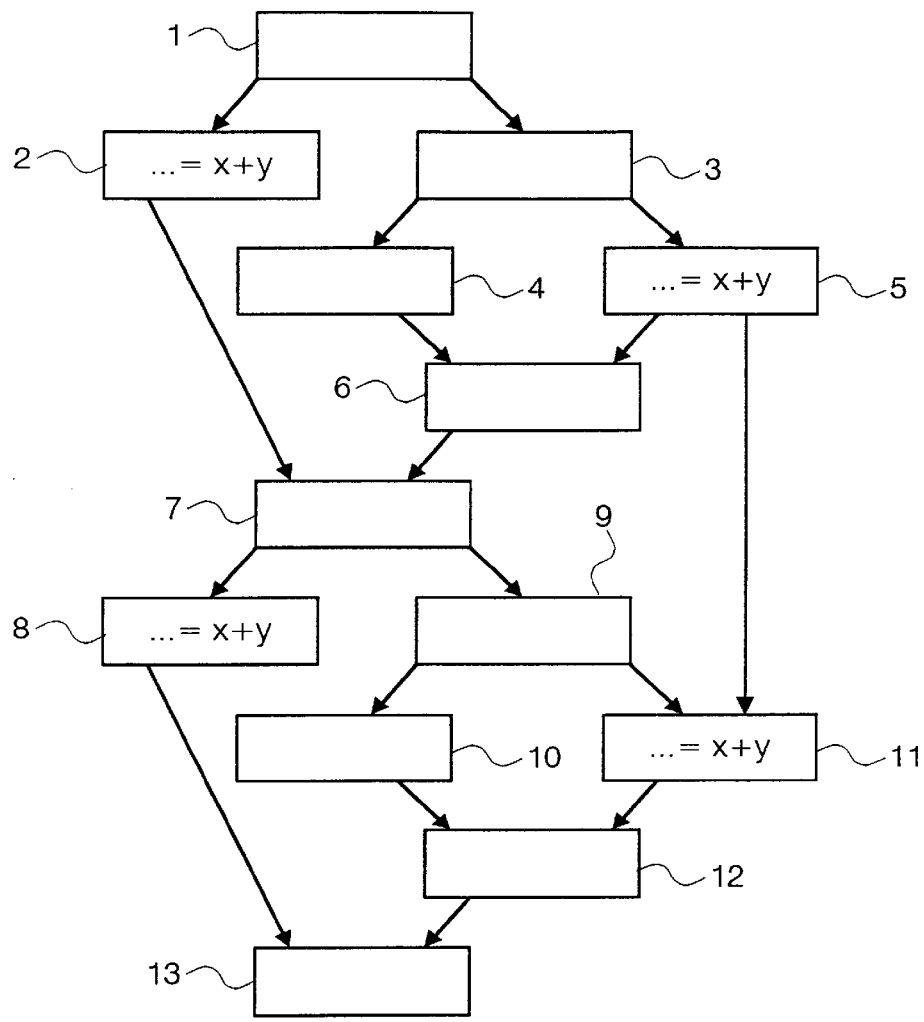
FIG. 11 illustrates a conservative estimate of cost and benefit FIG. 12 illustrate; one embodiment of the present invention that takes resource availability data flow analysis information into account when performing PRE

As illustrated in FIG. 11, if all paths other than the path 1.2.7.8.13 are ignored during cost-benefit analysis, given that its execution frequency is much higher than all other paths, the conservative cost analysis will fail to take advantage of the availability of expression x+y along the paths that visit node 5. The conservative cost analysis will also fail to take advantage of the availability of anticipatability of expression x+y at node 7 along paths that visit node 11. As shown in FIG. 11, the estimated cost is 60 while the true cost is 25. Similarly the estimated benefit is 100 while the true benefit is 115. For the path execution frequencies considered in this example, speculation of x+y at node 8 is still possible since the estimated benefit is greater than the estimated cost (100>60). In this case although the graph contains 10 distinct paths. Since one of those paths is executed far more frequently than all other paths, however, it was sufficient to consider only this path for optimization.

The equations for computing the conservative estimates of cost and benefit are given below. In these equations, paths HighPaths and LowPaths represent the high frequency and low frequency paths. The $UnAvailPaths_{exp}$ information is computed only for the high frequency paths. Thus, in computing the cost at node n, a conservative estimate is obtained by assuming that evaluations of exp will be placed along all paths in LowPaths that contain n. In computing the conservative estimate of the benefit, exp is assumed to be not anticipatable along any of the paths in LowPaths.

$$Cost_{exp}(n) \leq EstCost_{exp}(n) = \sum_{p \in HighPaths} UnAvailPaths_{exp(n)}(p) \times Freq(p) + \sum_{\substack{p \in HighPaths \\ \wedge n \in p}}^{Total} Freq(p)$$

$$Benefit_{exp}(n) \geq EstBenefit_{exp}(n) = \sum_{p \in HighPaths} MayAntiPaths_{exp(n)}(p) \times Freq(p)$$

According to one embodiment of the present invention, the PRE framework developed by Steffen is integrated with speculation. The original analysis by Steffen consists of a backward data flow analysis phase followed by a forward data flow analysis phase. Backward dataflow is used to identify all down-safe points, that is points to which expression evaluations can be safely hoisted. Forward data flow analysis identifies the earliest points at which expression evaluations can be placed. Finally, the expression evaluations are placed at points that are both earliest and down-safe.

The integrated framework according to one embodiment of the present invention consists of three phases. In the first phase (enable speculation), the conditional nodes at which speculation is to be enable are identified. In the second phase, (down-safety analysis), a modified down-safety analysis is performed, taking advantage of the speculation past the conditional nodes that have been enabled in the first phase. The third and final phase for (earliestness analysis) remains unchanged from Steffen's analysis.

During the enable speculation phase, in order to determine whether speculation should be enabled at a conditional node, the cost-benefit information at that node is considered. If the cost is less than the benefit for some expression, then speculation of exp at the conditional node is enabled. Enabling of speculation at one conditional node may require enabling of speculation at other conditional nodes. For example, as illustrated in FIG. 11, speculation at node 7 must be enabled in order to derive full benefits of speculation performed at node 4. The first equation below enables speculation at a node using cost-benefit information for that node and the second equation identifies indirectly enabled nodes through forward propagation. Finally, $SpecCond_{exp}(n)$ is defined to be 1 at all conditional nodes where speculation is enabled for exp and 0 for all other nodes.

$$Spec_{exp}(n) = \begin{cases} 1 & \text{if } Cost_{exp}(n) < Benefit_{exp}(n) \\ 0 & \text{otherwise} \end{cases}$$

$$Spec_{exp}(n) = Pres_{exp}(n) \wedge \bigvee_{m \in Pred(n)} Spec_{exp}(m)$$

$$SpecCond_{exp}(n) = \begin{cases} Spec_{exp}(n) & \text{if n is a conditional} \\ 0 & \text{otherwise} \end{cases}$$

During the down-safety analysis phase, node n is down-safe if one of the following conditions is true: (i) exp is computed in n; (ii) exp is preserved by n and it is anticipatable at n's exit along each path from n to the end of the program 1 or (iii) n is a conditional node at which speculation of exp has been enabled, that is SpecCond$_{exp}$ (n)=1. The first two conditions are used in Steffen's original framework while the third condition enables useful speculation according to one embodiment of the present invention.

$$D\text{-}Safe_{exp}(n) = \begin{cases} 0 & \text{if } n = \text{exit} \\ Used_{exp}(n) \vee & \text{otherwise} \\ (Pres_{exp}(n) \quad \wedge \quad D\text{-}Safe_{exp}(m)) \vee \\ \qquad\qquad m \in Succ(n) \\ SpecCond_{exp}(n) \end{cases}$$

During earliest analysis, the following equations proposed by Steffen are utilized. Finally, the code placement points are identified as nodes which are down-safe and earliest.

$$Earliest_{exp}(n) = \begin{cases} 1 & \\ \wedge & \text{if } n = \text{start} \\ m \in \overline{PredPres}_{exp}(m) \vee \overline{D\text{-}Safe}_{exp}(m) \wedge Earliest_{exp}(m) & \text{otherwise} \end{cases}$$

$$SafeEarliest_{exp}(n) = D\text{-}Safe_{exp}(n) \wedge Earliest_{exp}(n)$$

ii) Resource Availability Data Flow Analysis for PRE

According to one embodiment, speculation is integrated with a resource availability analysis and the busy code motion framework proposed by Steffen (described above) to perform PRE and ensure that hoisting of the redundant expression is only performed if it can be guaranteed that placement points for the expression after hoisting are ones at which the resource required for the expression's execution is free. The original analysis by Steffen consists of a backward data flow analysis phase followed by a forward data flow analysis phase. Backward data flow is used to identify all down-safe points, that is, points to which expression evaluations can be safely hoisted. Forward data flow analysis identifies the earliest points at which expression evaluations can be placed. Finally, the expression evaluations are placed at points that are both earliest and down-safe. Further details of performing speculation and hoisting of code using a cost-benefit data flow analysis based on path profiling information can be found in co-pending application having Ser. No. 08/853,275, filed on May 9, 1997, entitled "Optimizing Code Using A Cost-Benefit Data Flow Analysis Based On Path Profiling Information."

Based on the above description of code hoisting and cost benefit analysis, the following is a description of one embodiment of the present invention that takes resource availability data flow analysis information into account. The following description is applicable to an embodiment of the present invention that utilizes a traditional PRE technique (as described in Steffen, for example) as well as to an alternate embodiment that utilizes the improved PRE technique described above.

Figure 12:
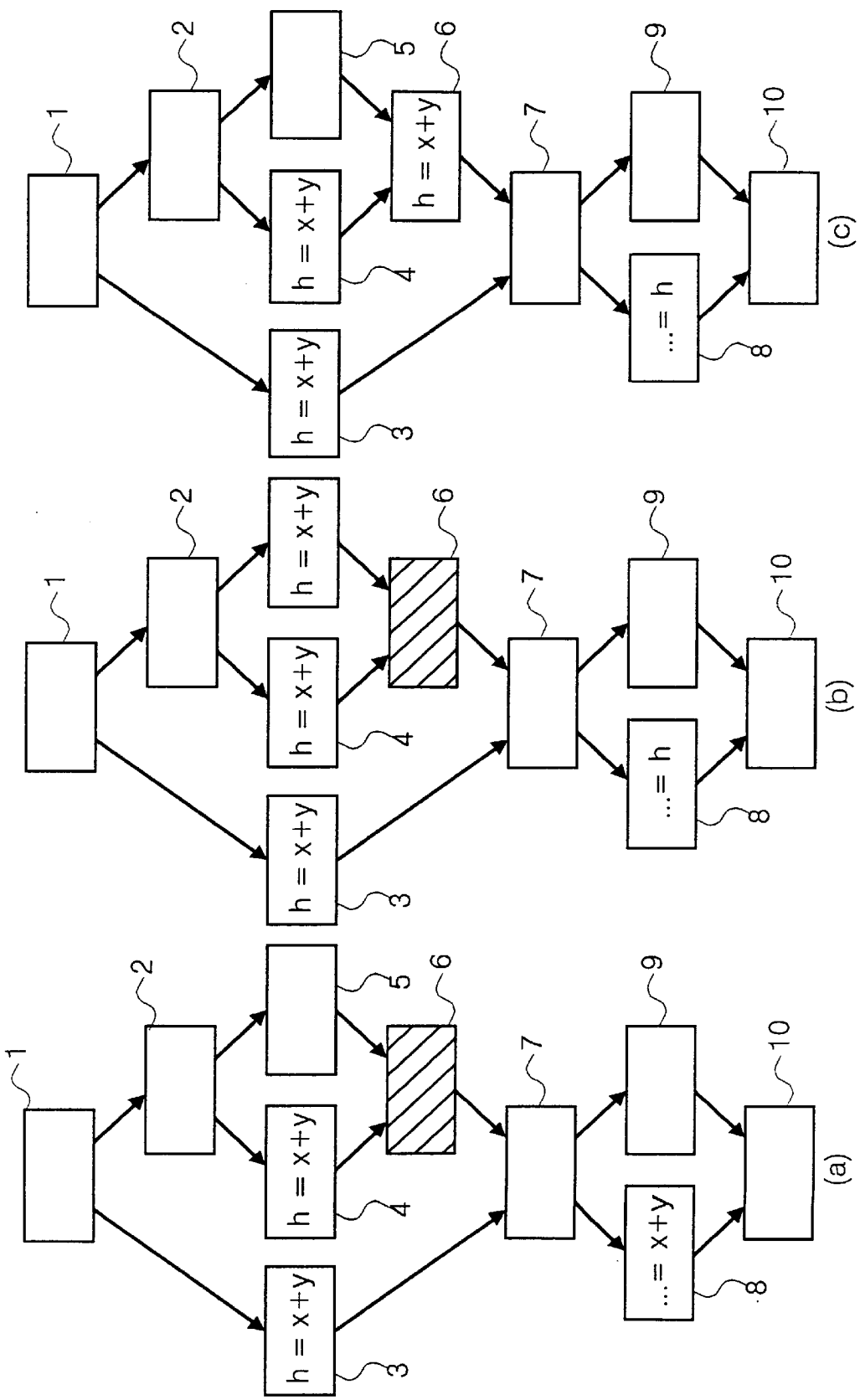

In FIG. 12, if the functional unit for the add operation is expected to be busy at node 5 and idle at node 6, resource sensitive hoisting will place the statement at node 6 as shown in FIG. 12. As before, speculative execution of the statement is required to perform hoisting above node 7. The hoisting past 7 is only performed, however, if the frequency with which path 1.3.7.8.10 (along which redundancy is eliminated) is executed is greater than the frequency with which the paths 1.2.4.6.7.8.10 and 1.2.5.6.7.9.10 (along which an additional instruction is introduced) are executed. This embodiment thus essentially places the statement at a point where the required resource is available and eliminates as much redundancy as possible in the process.

The resource availability data flow analysis determines the nodes above which the hoisting of statement s will not be inhibited by the lack of resources. A functional unit resource needed to execute the operation in an expression exp is available at the entry of node n if for each path p from the start node to n's entry one of the following conditions is true:

∃ a node b in which a resource is locally available and along the path from b to node n's entry, the variables whose values are used in exp are not redefined; or ∃ a node b which computes exp and after its computation the variables whose values are used in exp are not redefined.

To perform resource availability analysis for an expression exp, the following data flow variables are associated with each node:

PRES$_{exp}$(n) is 1 if given that the resource required by exp is available at n's entry, it is also available at n's exit; otherwise it is 0. In particular, PRES$_{exp}$(n) is 1 if the statement in n does not define a variable used by exp.

USED$_{exp}$(n) is 1 if the statement in n evaluates the expression exp and this evaluation of exp is available at n's exit, that is, the variables used by exp are not redefined in n after exp's evaluation.

FREE$_{exp}$(n) is 1 if the required resource is free for use by exp in n if exp is moved to n through hoisting; otherwise it is 0.

$$N\text{-}RAVAIL_{exp}(n) = \bigwedge_{m \in Pred(n)} X\text{-}RAVAIL_{exp}(m)$$

$$X\text{-}RAVAIL_{exp}(n) =$$

$$(N\text{-}RAVAIL_{exp}(n) \wedge RPES_{exp}(n)) \vee (USED_{exp}(n) \vee FREE_{exp}(n))$$

The expression hoisting and PRE framework according to one embodiment is a modification of the code motion framework developed by Steffen. PRE is performed in two steps: down-safety analysis which determines the points to which expression evaluations can be hoisted and earliestness analysis which locates the earliest points at which expression evaluations are actually placed to achieve PRE. This framework is applicable to an embodiment of the present invention that utilizes a traditional PRE technique (as described in Steffen, for example) as well as to an alternate embodiment that utilizes the improved PRE technique described above. The first step is modified to incorporate resource availability information while the second step remains unchanged. The modified equations for the down-safety analysis are given below.

$$\text{N-DSAFE}_{\text{exp}}(n) = \begin{cases} 1 & \text{if } \text{Used}_{\text{exp}}(n) = 1 \\ \text{X-DSAFE}_{\text{exp}}(n) \wedge \text{PRES}_{\text{exp}}(n) & \text{otherwise} \end{cases}$$

$$\text{X-DSAFE}_{\text{exp}}(n) = \begin{cases} 0 & \text{if } n = \text{exit} \\ \text{X-RVAIL}_{\text{exp}}(n) \wedge \bigwedge_{m \in \text{Succ}(n)} \text{N-DSAFE}_{\text{exp}}(m) & \text{otherwise} \end{cases}$$

Figure 13:
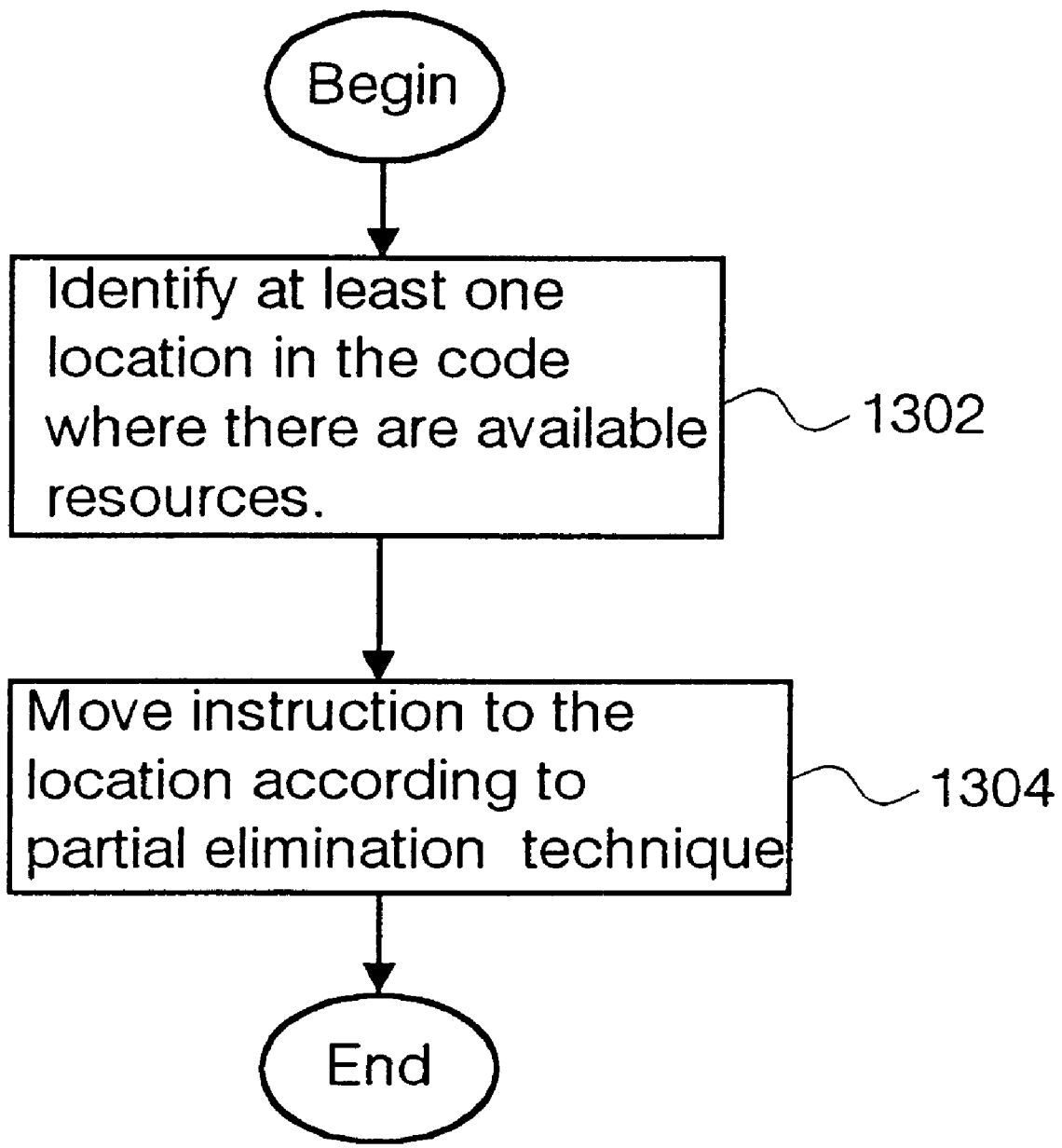
FIG. 13 is a flow chart illustrating one embodiment of the present invention

FIG. 13 is a flow chart illustrating one embodiment of the present invention. In step 1302, at least one location in the code is identified that has available resources. In step 1304, at least one instruction is moved to the identified location according to a partial elimination technique. One instruction may be moved to multiple locations, multiple instructions may be moved to one location, or multiple instructions may be moved to multiple locations to maintain program correctness.

Figure 14:
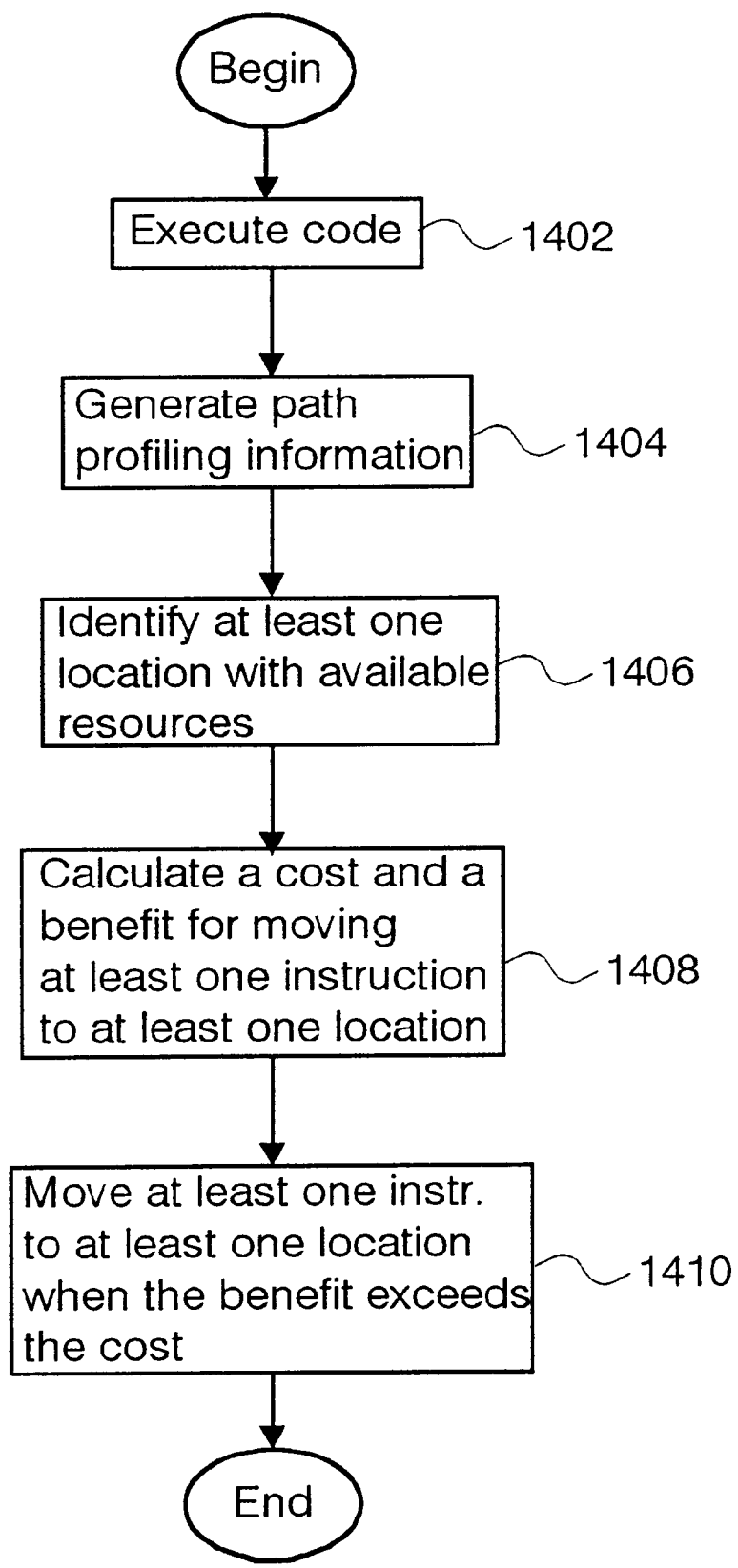
FIG. 14 is a flow chart illustrating an alternate embodiment of the present invention

Finally, FIG. 14 is a flow chart illustrating an alternate embodiment of the present invention. In step 1402, a piece of code in executed for the first time. Path profiling information is generated based on the first execution of the code in step 1404. In step 1406, at least one location is identified that has available resources. In step 1408, based on the path profiling information generated in step 1404, a cost and a benefit are calculated for moving an instruction to a location having available resources. One instruction may be moved to multiple locations, multiple instructions may be moved to one location, or multiple instructions may be moved to multiple locations, depending on the cost-benefit information. The instruction is moved in step 1410 when the benefit associated with the move exceeds the cost associated with the move.

Thus, a method and apparatus for optimizing code using a cost-benefit data flow analysis based on path profiling information is disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. A computer implemented method for optimizing computer code using resource based partial elimination techniques, said code including a plurality of instructions, the method comprising:

identifying at least one location in said computer code that has available resources;

executing said computer code to generate path profiling information; and calculating a cost and a benefit for moving one of said plurality of instructions to said at least one location, said cost and said benefit based on said path profiling information; and moving said one of said plurality of instructions according to said partial elimination techniques to said at least one location.

2. The computer implemented method according to claim 1 wherein moving said one of said plurality of instructions comprises moving said one of said plurality of instructions when said benefit exceeds said cost.

3. A computer implemented method for performing resource sensitive code hoisting in a program, said program including a plurality of paths, said method comprising:

examining path profile information for each of said plurality of paths;

determining available resources for nodes on each of said plurality of paths;

identifying at least one of said nodes having said available resources;

generating a cost and a benefit for each of said plurality of paths, said cost benefit data being based on said path profile information; and hoisting an instruction to one of said nodes having said available resources when said benefit exceeds said cost, said hoisting specified by a partial elimination technique.

4. A computer implemented method for performing resource sensitive code sinking in a program, said program including a plurality of paths, said method comprising:

examining path profile information for each of said plurality of paths;

determining available resources for nodes on each of said plurality of paths;

identifying at least one of said nodes having said available resources;

generating cost benefit data for each of said plurality of paths, said cost benefit data being based on said path profile information; and sinking an instruction to one of said nodes having said available resources when said benefit exceeds said cost, said sinking specified by a partial elimination technique.

5. A machine readable medium having stored thereon data representing sequences of instructions, which when executed by a computer system, cause said computer system to perform a method defined by:

identifying at least one location in code that has available resources;

executing said code to generate path profiling information;

calculating a cost and a benefit for moving one of said plurality of instructions to said at least one location, said cost and said benefit based on said path profiling information; and moving one of a plurality of instructions in said code according to partial elimination techniques to said at least one location.

6. The machine readable medium according to claim 5 wherein moving said one of said plurality of instructions comprises moving said one of said plurality of instructions when said benefit exceeds said cost.

7. A machine readable medium having stored thereon data representing sequences of instructions, which when executed by a computer system, cause said computer system to perform a method defined by:

- determining available resources for nodes on each of said plurality of paths;
- identifying at least one of said nodes having said available resources;
- generating a cost and a benefit for each of said plurality of paths, said cost benefit data being based on said path profile information; and
- hoisting an instruction to one of said nodes having said available resources when said benefit exceeds said cost, said hoisting specified by a partial elimination technique.

8. A machine readable medium having stored thereon data representing sequences of instructions, which when executed by a computer system, cause said computer system to perform a method defined by:

- examining path profile information for each of a plurality of paths in a program;
- determining available resources for nodes on each of said plurality of paths;
- identifying at least one of said nodes having said available resources;
- generating cost benefit data for each of said plurality of paths, said cost benefit data being based on said path profile information; and
- sinking an instruction to one of said nodes having said available resources when said benefit exceeds said cost, said sinking specified by a partial elimination technique.

\* \* \* \* \*

UNITED STATES PATENT AND TRADEMARK OFFICE
CERTIFICATE OF CORRECTION

PATENT NO.    : 6,044,221
DATED         : March 28, 2000
INVENTOR(S)   : Gupta et al.

It is certified that error appears in the above-identified patent and that said Letters Patent is hereby corrected as shown below:

In the printed patent page 15 of the application appears before page 14 of the application. Therefore column 6 line 50 beginning with word "statement" to column 7 line 17 ending with the word "paths" should be deleted and inserted at column 7 line 56 after "categories with respect to the"

Column 11,
Line 51, delete "Estimates" and insert -- estimates --.

Column 19,
Line 13, delete "UnAvailPaths$_{exp}$ =" and insert -- UnAvailPaths $_{exp}$ (n) --.
Line 18, delete "(n)".

Column 24,
Line 17, delete "⊐" and insert --*⊐--.
Line 30, delete "⊐" and insert --*⊐--.

Signed and Sealed this

Nineteenth Day of February, 2002

Attest:

*Attesting Officer*

JAMES E. ROGAN
*Director of the United States Patent and Trademark Office*